United States Patent
Collier

(10) Patent No.: US 9,282,721 B2
(45) Date of Patent: Mar. 15, 2016

(54) SYSTEM AND METHOD OF USE OF GYROSCOPIC FORCES ON ANIMAL EQUILIBRIUM

(71) Applicant: Greg Collier, Lubbock, TX (US)

(72) Inventor: Greg Collier, Lubbock, TX (US)

(*) Notice: Subject to any disclaimer, the term of this patent is extended or adjusted under 35 U.S.C. 154(b) by 163 days.

(21) Appl. No.: 13/716,085

(22) Filed: Dec. 14, 2012

(65) Prior Publication Data
US 2014/0165924 A1 Jun. 19, 2014

(51) Int. Cl.
*A01K 37/00* (2006.01)
*A01K 15/02* (2006.01)

(52) U.S. Cl.
CPC ............... *A01K 15/02* (2013.01); *A01K 15/027* (2013.01)

(58) Field of Classification Search
CPC ..... A01K 29/00; A01K 29/005; A01K 15/02; A01K 15/027; A61B 5/0002
USPC ............ 54/71, 1; 74/5 R, 5.1, 5.12, 5.2, 5.22, 74/5.34, 5.37, 5.4, 5.47; 119/712, 815, 119/839, 850, 856–859, 174, 908, 905, 119/907; 434/225; 601/85, 112
See application file for complete search history.

(56) References Cited

U.S. PATENT DOCUMENTS

| | | | |
|---|---|---|---|
| 3,388,530 A * | 6/1968 | Parker | 54/44.1 |
| 3,942,477 A | 3/1976 | Richardson | |
| 5,823,845 A * | 10/1998 | O'Berrigan | 446/234 |
| 6,705,174 B2 | 3/2004 | Tippett | |
| 7,121,159 B2 | 10/2006 | Tippett | |
| 7,383,747 B2 | 6/2008 | Tippett | |
| 2010/0156653 A1 * | 6/2010 | Chaudhari et al. | 340/686.1 |
| 2012/0111286 A1 * | 5/2012 | Lee et al. | 119/719 |
| 2012/0253247 A1 * | 10/2012 | Aoki et al. | 601/112 |

* cited by examiner

*Primary Examiner* — Joshua Huson
(74) *Attorney, Agent, or Firm* — Shannon L Warren

(57) ABSTRACT

An animal training system is disclosed. Said animal training system comprises a one or more gyroscopic assemblies each having a one or more rotors, a one or more gyroscope brackets, a power source attached to a one or more engines, and a one or more gyroscopic resistance forces. Said one or more rotors each comprise an axis. Said one or more gyroscope brackets attaching said one or more gyroscopic assemblies to an animal. Said one or more engines transmit a torque to said one or more rotors. Said one or more gyroscopic resistance forces are generated by rotating said one or more rotors in said one or more gyroscopic assemblies.

28 Claims, 31 Drawing Sheets

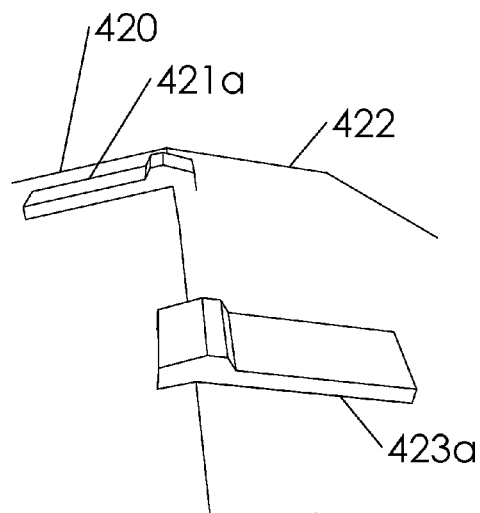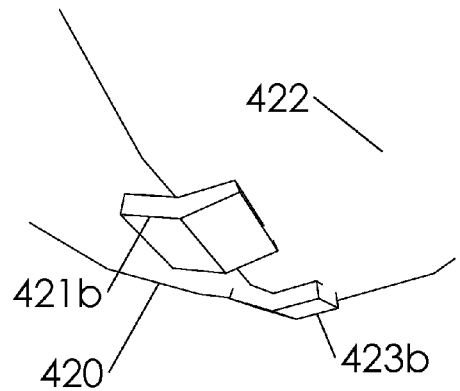
Fig. 4F    Fig. 4G
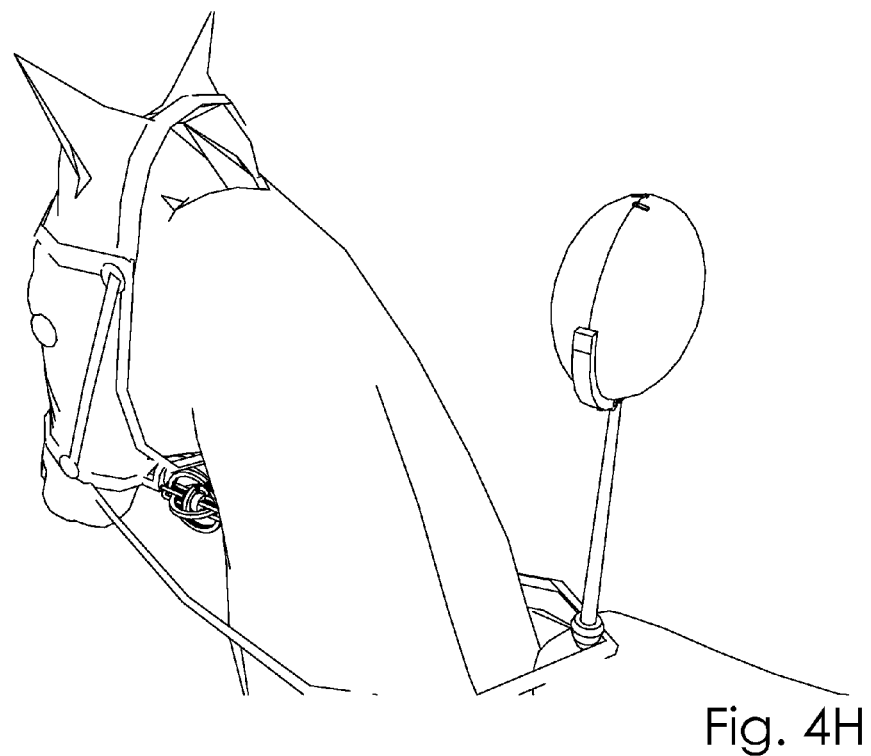
Fig. 4H

SYSTEM AND METHOD OF USE OF GYROSCOPIC FORCES ON ANIMAL EQUILIBRIUM

BACKGROUND

This disclosure relates generally to a system and method of use of gyroscopic forces on animal equilibrium. Animal training systems are well known and the mechanics and use of gyroscopic forces are also well known. However, the combination and use of these arts are as yet unexplored as herein disclosed.

An example of an animal training system can be found in U.S. Pat. No. 3,942,477. In that patent application, Mr. Richardson quoted Mr. John Solomon Rarey (a horse trainer of the 19$^{th}$ century) who said: "The horse is so constituted by nature that he will not offer resistance to any demand made of him which he fully comprehends . . . . That we can, in compliance with the laws of his nature, by which he examines all things new to him, take any object, however frightful, around, or on him that does not inflict pain, without causing him to fear."

None of the prior inventions and patents, taken either singularly or in combination, is seen to describe the instant disclosure as claimed. Thus, a system and method of use of gyroscopic forces on animal equilibrium is desirable.

SUMMARY

An animal training system, an animal training method and an animal stabilization system are disclosed.

Said animal training system comprises a one or more gyroscopic assemblies each having a one or more rotors, a one or more gyroscope brackets, a power source attached to a one or more engines, and a one or more angular momentum forces. Said one or more rotors each comprise an axis. Said one or more gyroscope brackets attaching said one or more gyroscopic assemblies to an animal. Said one or more engines transmit a torque to said one or more rotors. Said one or more angular momentum forces are generated by rotating said one or more rotors in said one or more gyroscopic assemblies.

Said animal training method comprises: attaching one or more gyroscopic assemblies each having a one or more rotors to an animal; rotating said one or more external rotors with one or more engines; generating a one or more angular momentum forces with said one or more one or more external rotors; directing said one or more angular momentum forces at one or more parts of a body of said animal; and training said animal.

Said animal stabilization system comprises a one or more gyroscopic assemblies each having a one or more rotors, a one or more gyroscope brackets, a power source attached to a one or more engines, and a one or more angular momentum forces. Said one or more rotors each comprise an axis. Said one or more gyroscope brackets attaching said one or more gyroscopic assemblies to an animal. Said one or more engines transmit a torque to said one or more rotors. Said one or more angular momentum forces are generated by rotating said one or more rotors in said one or more gyroscopic assemblies.

BRIEF DESCRIPTION OF THE DRAWINGS

FIG. 3A illustrates a perspective overview of said first gyroscopic assembly unattached to said horn mount assembly.

FIGS. 3B and 3C illustrate a detailed perspective view of said first socket of said gyroscope bracket and a detailed perspective side view of said first prong of said second gyroscopic assembly.

FIGS. 3D and 3E illustrate a perspective overview of a hinge assembly of said gyroscope bracket.

FIGS. 3F, 3G and 3H illustrate a perspective lower view of said hinge assembly in an unlatched and open configuration, a closed and unlatched configuration, and a closed and latched configuration.

FIGS. 4A-4G illustrate a series of views of said first gyroscopic assembly.

FIGS. 4A and 4B illustrate a perspective overview of said second gyroscopic assembly with two framing members.

FIGS. 4C, 4D and 4E illustrate a perspective overview of said second gyroscopic assembly with a first casing, an elevated front view and an elevated side view of said second gyroscopic assembly with said first casing and a second casing.

FIGS. 4F and 4G illustrate a perspective top side view of said first clip and said first clip, and a perspective bottom side view of said second clip and said second clip.

FIG. 4H illustrates said second gyroscopic assembly on said animal comprising said casing assembly.

FIGS. 10D, 10E and 10F illustrate an elevated side view of said third external rotor with said central portion; an elevated top view of said central portion with said second external rotor, said first leg and said second leg; and an elevated front view of said central portion with said third leg, fourth leg, said fifth leg, said sixth leg and said first external rotor.

DETAILED DESCRIPTION

Described herein is a system and method of use of gyroscopic forces on animal equilibrium. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
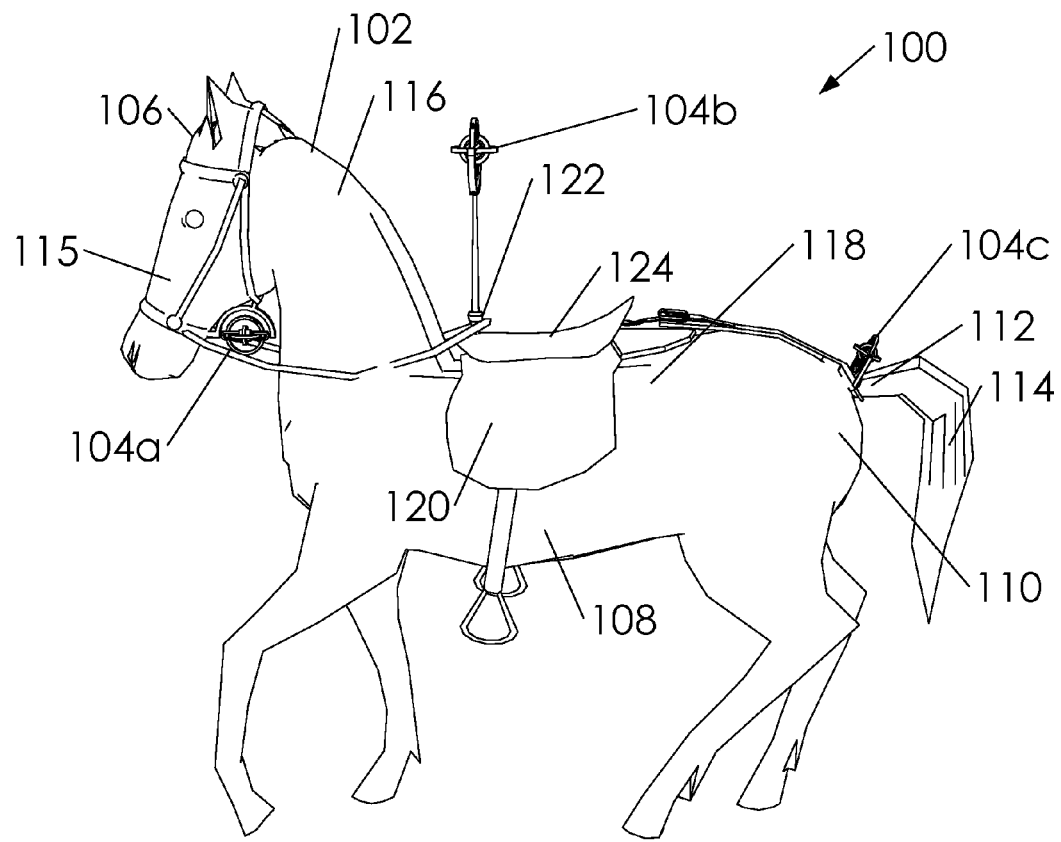
FIG. 1A illustrates a perspective overview of an animal training system on an animal.

FIG. 1A illustrates a perspective overview of an animal training system 100 on an animal 102. In one embodiment, said system and method of use of gyroscopic forces on animal equilibrium can comprise said animal training system 100. In one embodiment, said animal training system 100 can comprise one or more gyroscopic assemblies. In one embodiment, said one or more gyroscopic assemblies can comprise a first gyroscopic assembly 104a, a second gyroscopic assembly 104b and a third gyroscopic assembly 104c. Said animal 102 can comprise a head 106, a body 108, a buttock 110, a tail head 112, a tail 114, a muzzle 115, a neck 116 and a back 118. In one embodiment, said animal 102 can comprise a horse, but said animal training system 100 can be used on a variety of animals other than horses. In one embodiment, said animal 102 can comprise a dog, livestock, or other animal. In one embodiment, said animal 102 can be fitted with a saddle 120 on said back 118 of said animal 102. In one embodiment, said saddle 120 can comprise a horn 122 and a seat 124, as known in the art.

Figure 1B:
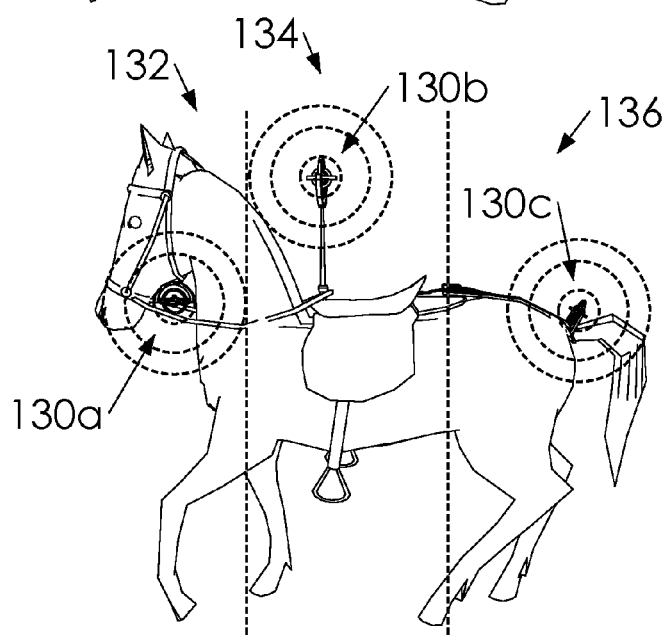
FIG. 1B illustrates a plurality of sensory locations on said animal.
Figure 2A:
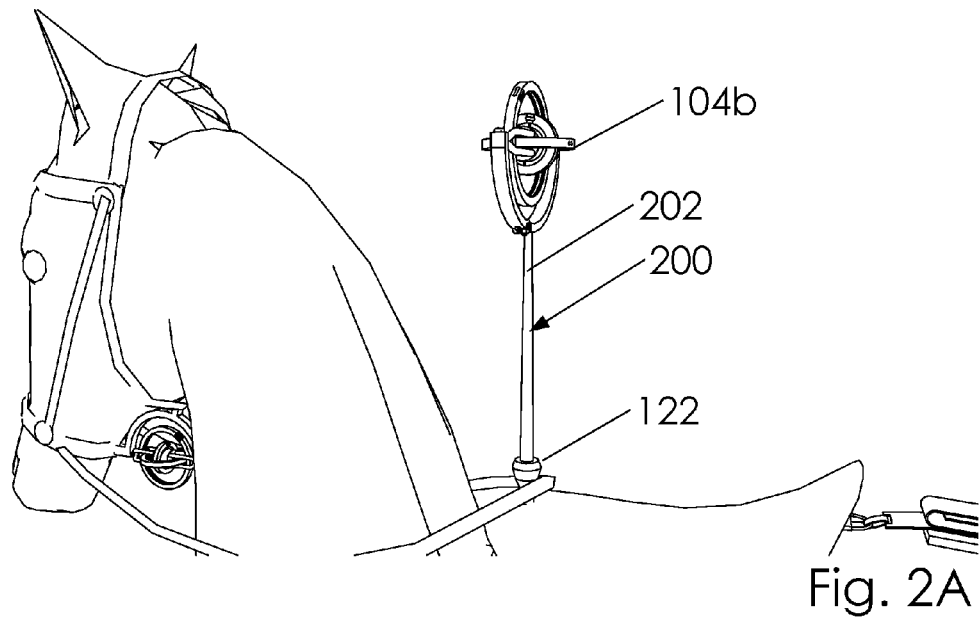
FIGS. 2A, 2B, 2C and 2D illustrate a series of perspective overviews of said second gyroscopic assembly.
Figures 2B, 2C, 2D:
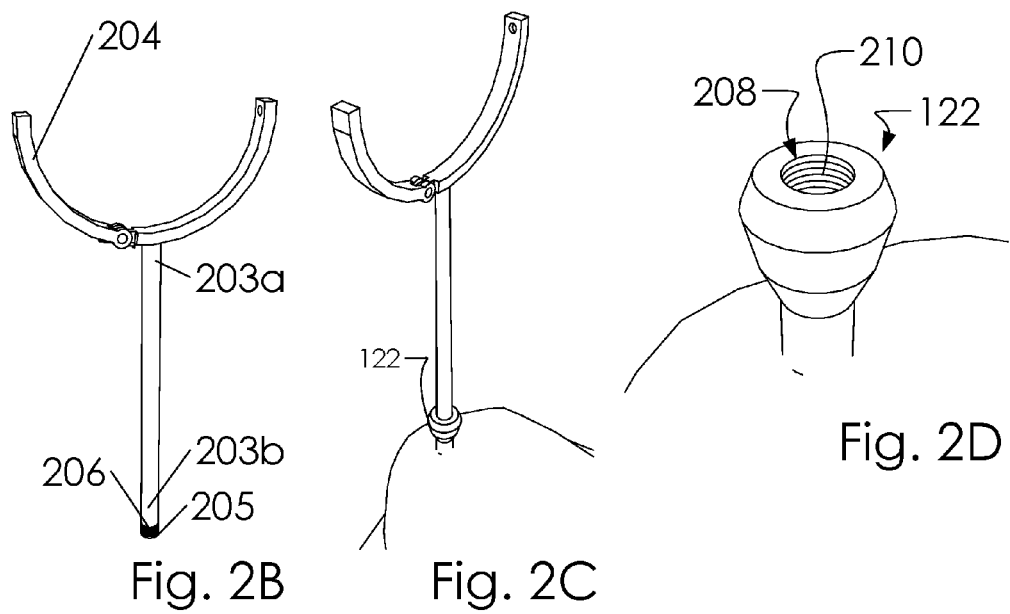

FIG. 1B illustrates a plurality of sensory locations on said animal 102. In one embodiment, said animal training system 100 can attach to said animal 102 at a plurality of sensory locations. In one embodiment, said plurality of sensory locations can comprise a forward sensory location 130a, a central sensory location 130b and a rear sensory location 130c. In one embodiment, said plurality of sensory locations can comprise locations on said animal 102 corresponding to a sense of equilibrium on said animal 102. In one embodiment, said animal 102 can comprise a forward portion 132, a midsection 134 and a rearward portion 136 of said body 108. In one embodiment, said one or more gyroscopic assemblies can be attached to any part of said body 108 of said animal 102. In one embodiment, said first gyroscopic assembly 104a can attach to said forward portion 132, said second gyroscopic assembly 104b can attach to said midsection 134, and said third gyroscopic assembly 104c can attach to said rearward portion 136 of said body 108 of said animal 102.

FIGS. 2A, 2B, 2C and 2D illustrate a series of perspective overviews of said second gyroscopic assembly 104b. In one embodiment, second gyroscopic assembly 104b can attach to said horn 122 with a horn mount assembly 200. In one embodiment, said horn mount assembly 200 can comprise a shaft 202 (having a first end 203a and a second end 203b) and a gyroscope bracket 204. In one embodiment, said second end 203b can comprise a base portion 205 having an external threading 206. In one embodiment, said first end 203a attaches to said gyroscope bracket 204. In one embodiment, said shaft 202 can comprise a cylindrical rod. In one embodiment, said horn 122 can comprise a socket 208 having an internal threading 210. In one embodiment, said base portion 205 of said shaft 202 can attach to said horn 122. In one embodiment, said external threading 206 of said base portion 205 can attach to said internal threading 210 of said socket 208.

In one embodiment, said animal training system 100 can comprise a one or more gyroscope brackets capable of attaching said one or more gyroscopic assemblies to said animal 102. In one embodiment, said one or more gyroscope brackets can comprise said gyroscope bracket 204.

FIGS. 3A-3H illustrate a series of perspective views of said horn mount assembly 200 attaching to said first gyroscopic assembly 104a.

Figure 3A:
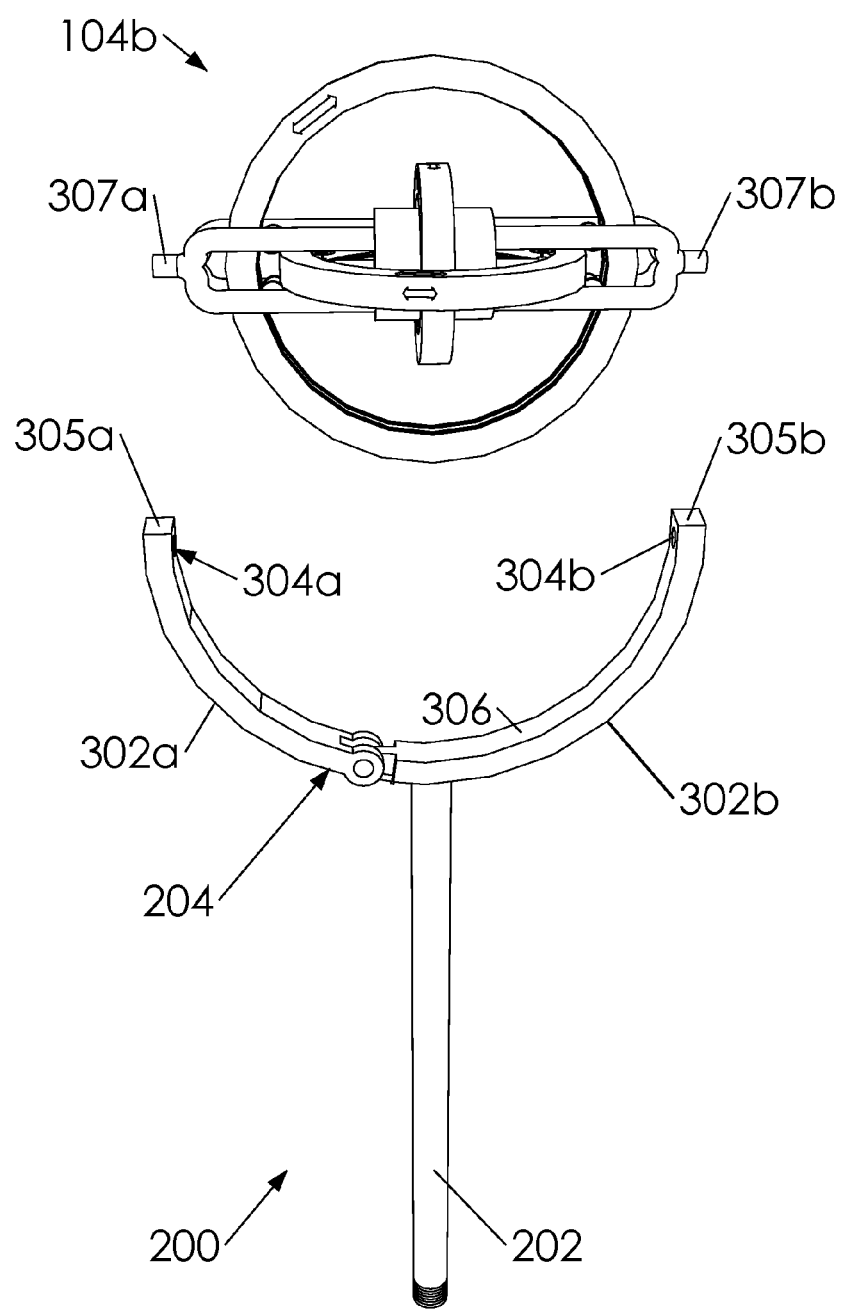
FIGS. 3A-3H illustrate a series of perspective views of said horn mount assembly attaching to said first gyroscopic assembly.

FIG. 3A illustrates a perspective overview of said first gyroscopic assembly 104a unattached to said horn mount assembly 200. In one embodiment, said gyroscope bracket 204 can comprise a first side portion 302a and a second side portion 302b. In one embodiment, said first side portion 302a can comprise a first socket 304a, and said second side portion 302b can comprise a second socket 304b. In one embodiment, said gyroscope bracket 204 can comprise a "U" shape having said first side portion 302a as its first side with a first end 305a and said second side portion 302b as its second side having a second end 305b. In one embodiment, said gyroscope bracket 204 has an internal surface 306. In one embodiment, said first socket 304a and said second socket 304b can comprise a pair of sockets capable of receiving and holding a portion of one of said one or more gyroscopic assemblies (such as said second gyroscopic assembly 104b, illustrated). In one embodiment, said pair of sockets can be in said internal surface 306 of said gyroscope bracket 204 at said first end 305a and said second end 305b on opposing internal sides of said "U" shape. In one embodiment, said second gyroscopic assembly 104b can be substantially identical to each of said one or more gyroscopic assemblies. In one embodiment, said second gyroscopic assembly 104b can comprise two prongs. In one embodiment, said two prongs can comprise a first prong 307a and a second prong 307b. In one embodiment, said two prongs of said second gyroscopic assembly 104b can be inserted into said pair of sockets of said gyroscope bracket 204. Alternatively, in one embodiment, one of said two prongs (for example said first prong 307a), can be round rather than oval shaped in its cross-section and an external surface of said one of said two prongs can comprise an external threading; wherein, said one of said two prongs can attach to said socket 208 of said horn 122 by screwing said one of said two prongs into said internal threading 210 of said horn 122.

Figure 3B:
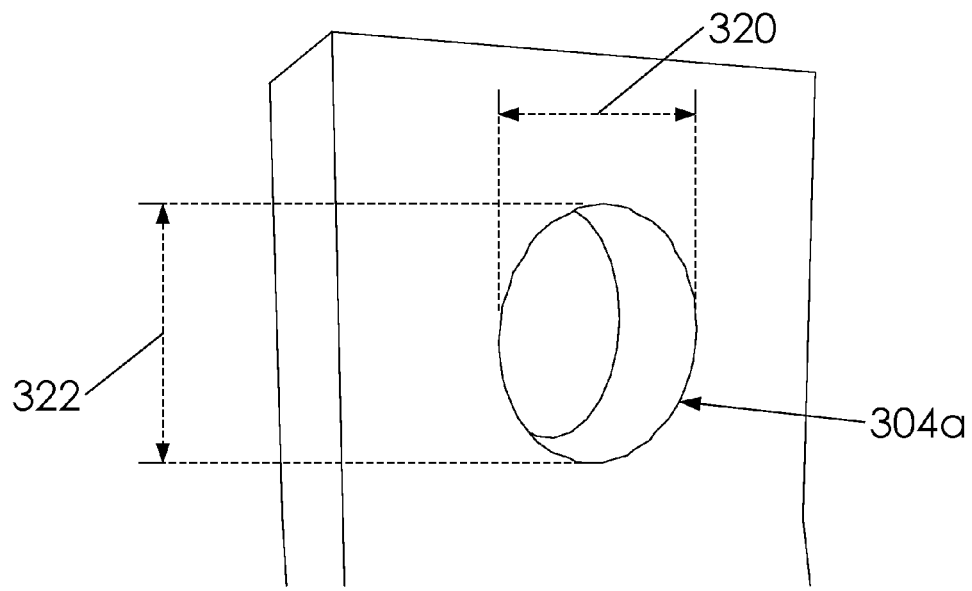
Figure 3C:
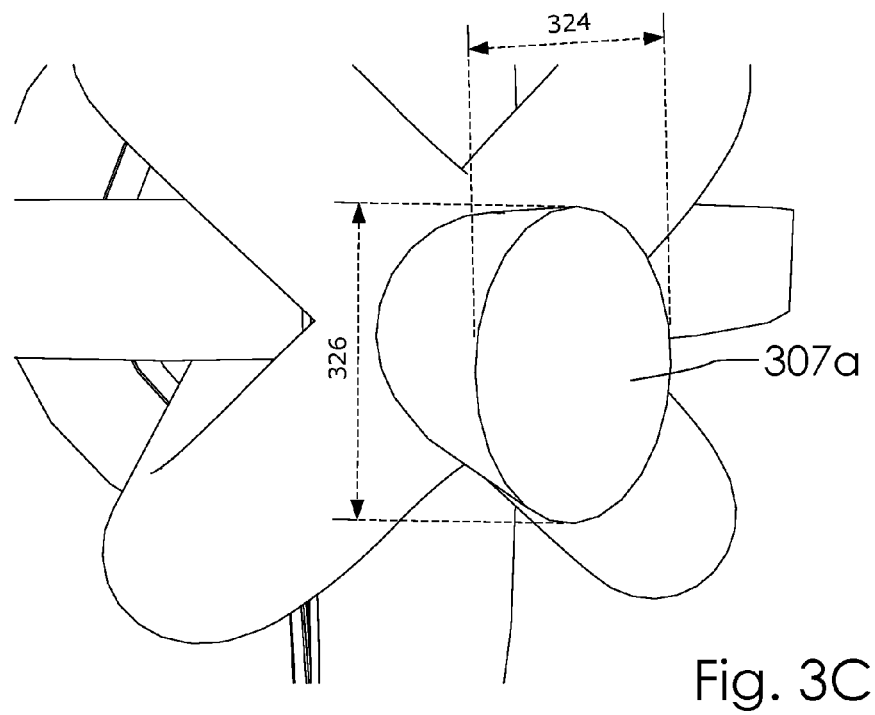

FIGS. 3B and 3C illustrate a detailed perspective view of said first socket 304a of said gyroscope bracket 204 and a detailed perspective side view of said first prong 307a of said second gyroscopic assembly 104b. In one embodiment, said first socket 304a can comprise a width 320 and a height 322. In one embodiment, said first prong 307a can comprise a width 324 and a height 326. In one embodiment, said first socket 304a and said second socket 304b can comprise similar dimensions. Likewise, in one embodiment, said first prong 307a and said second prong 307b can comprise similar dimensions. In one embodiment, said width 320 can be equal to or greater than said width 324, and said height 322 can be equal to or greater than said height 326. Accordingly, said first prong 307a can slide into said first socket 304a. In one embodiment, said width 320 and said height 322 can be dissimilar in size and therefore they can be oval shaped. Likewise, said width 324 and said height 326 can be dissimilar in size and therefore they can be oval shaped. In one embodiment, said height 326 can be greater than said width 320. Accordingly, with said first prong 307a inside of said first socket 304a, said second gyroscopic assembly 104b can be incapable of spinning within said pair of sockets in said gyroscope bracket 204. Alternatively, in one embodiment, said pair of sockets and said two prongs can comprise a cross-section comprising a non-rounded shape (such as a rectangle, triangle or similar) and thereby prevent rotation while they are mated.

Figure 3D:
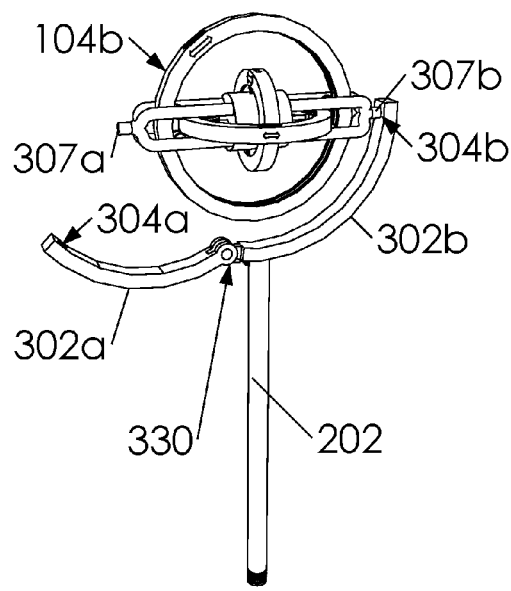
Figure 3F:
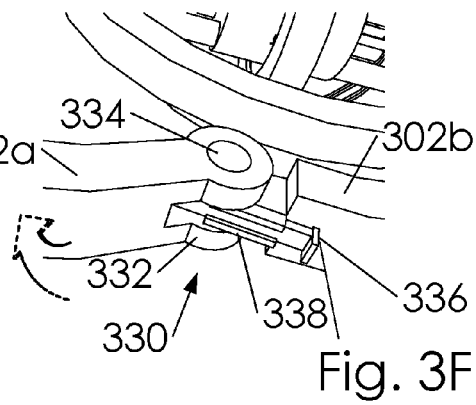
Figure 3G:
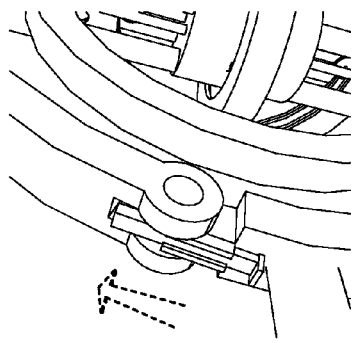
Figure 3E:
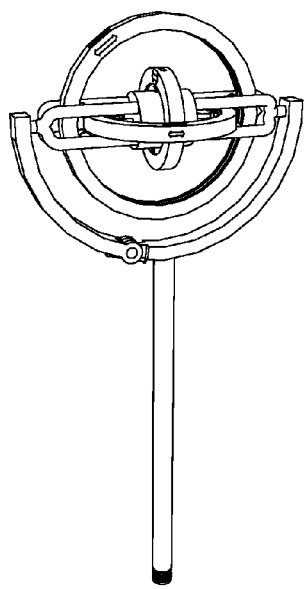

FIGS. 3D and 3E illustrate a perspective overview of a hinge assembly 330 of said gyroscope bracket 204. In one embodiment, said gyroscope bracket 204 can comprise said hinge assembly 330. In one embodiment, said hinge assembly 330 can open up said gyroscope bracket 204 so as to receive said first gyroscopic assembly 104a. In one embodiment, said hinge assembly 330 can attach said first side portion 302a to said second side portion 302b. In one embodiment, said first side portion 302a can rotate about said hinge assembly 330 while said second side portion 302b remains relatively unmoved. In one embodiment, said second side portion 302b attaches to said shaft 202. In one embodiment, attaching said one or more gyroscopic assemblies to said gyroscope bracket 204 can comprise opening said gyroscope bracket 204 by releasing said hinge assembly 330 from in a closed configuration, inserting said second prong 307b into said second socket 304b, aligning said first prong 307a with said first socket 304a, and closing said gyroscope bracket 204 by latching said hinge assembly 330 with said gyroscope bracket 204 in said closed configuration. In one embodiment, said closed configuration of said gyroscope bracket 204 can comprise latching said hinge assembly 330 with said gyroscope bracket 204 in said "U" shape.

Figure 3H:
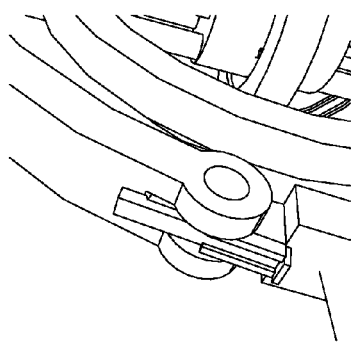

FIGS. 3F, 3G and 3H illustrate a perspective lower view of said hinge assembly 330 in an unlatched and open configuration, a closed and unlatched configuration, and a closed and latched configuration. In one embodiment, said open configuration can comprise said hinge assembly 330 in a configuration other than said closed configuration. In one embodiment, said hinge assembly 330 can comprise an internal barrel 332 and an external barrel 334. In one embodiment, said first side portion 302a can comprise said internal barrel 332, and said second side portion 302b can comprise said external barrel 334. In one embodiment, said internal barrel 332 can attach around said external barrel 334, and said hinge assembly 330 can pivot around said external barrel 334. In one embodiment, said hinge assembly 330 can further comprise a latch 336 and a latch track 338. In one embodiment, said latch track 338 can be attached to said second side portion 302b near said hinge assembly 330. In one embodiment, latch 336 can slide in a lateral direction within said latch track 338. In one embodiment, said latched configuration can comprise a portion of said latch 336 holding a portion of said first side portion 302a in said closed configuration. In one embodiment, said unlatched configuration can comprise said latch 336 no longer holding said portion of said first side portion 302a in said closed configuration. In one embodiment, said latch 336 can slide within said latch track 338 between said latched and said unlatched configurations. In one embodiment, said latch track 338 can comprise a track capable of wrapping around a portion of said latch 336 so as to hold said latch 336 between said latched configuration and said unlatched configuration.

FIGS. 4A-4G illustrate a series of views of said first gyroscopic assembly 104a. In one embodiment, said first gyroscopic assembly 104a can comprise a representative example of said one or more gyroscopic assemblies.

Figure 4A:
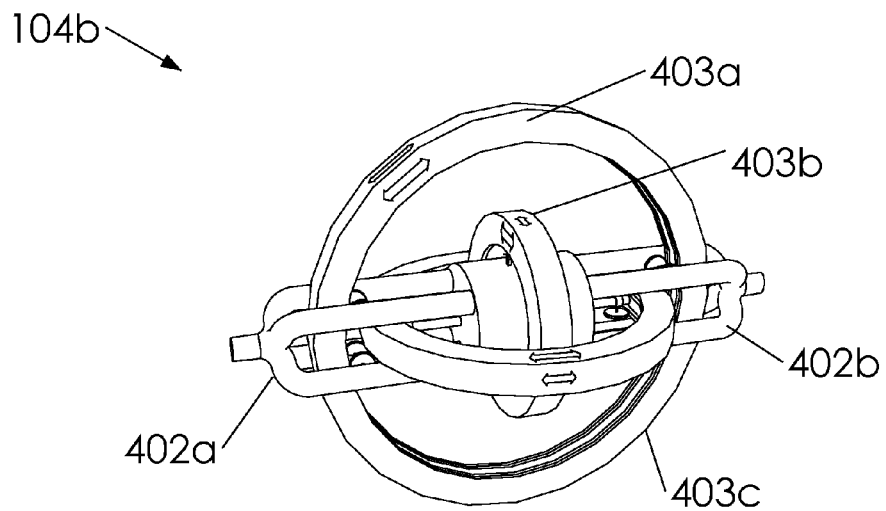
Figure 4B:
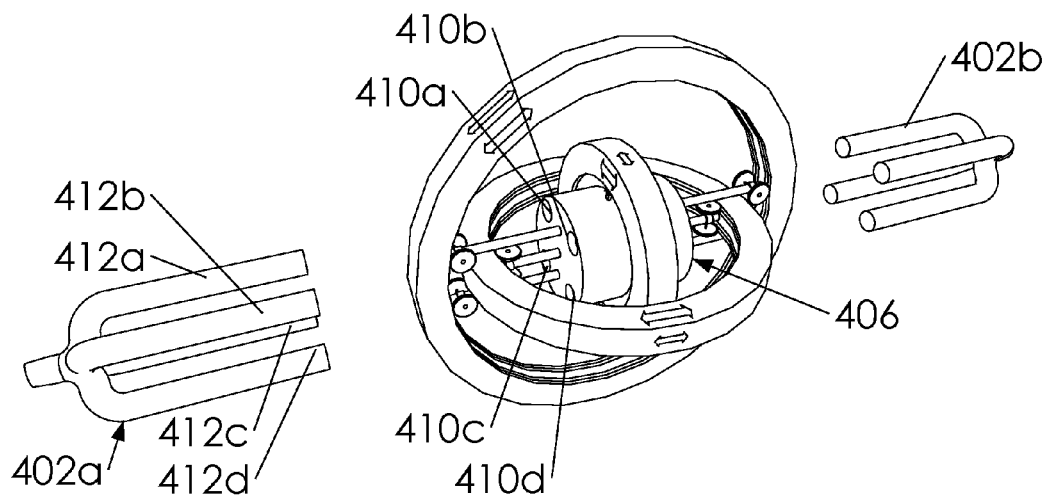

FIGS. 4A and 4B illustrate a perspective overview of said second gyroscopic assembly 104b with two framing members. In one embodiment, said two framing members can comprise a first framing member 402a and a second framing member 402b. In one embodiment, said two framing members can attach said second gyroscopic assembly 104b to said gyroscope bracket 204. In one embodiment, said first framing member 402a can comprise first prong 307a, and said second framing member 402b can comprise said second prong 307b. In one embodiment, said one or more gyroscopic assemblies can comprise one or more external rotors. In one embodiment, said one or more external rotors can comprise a first external rotor 403a, a second external rotor 403b and a third external rotor 403c. In one embodiment, said one or more external rotors can comprise parts of one or more gyroscopes. In one embodiment, said first gyroscopic assembly 104a can comprise said one or more gyroscopes. In one embodiment, said one or more gyroscopes can be aligned in one or more planes. In one embodiment, said one or more gyroscopes can be aligned in three planes, each being 90 degrees perpendicular to one another (as described below).

In one embodiment, said two framing members attach to an internal assembly 406 within said second gyroscopic assembly 104b. In one embodiment, said internal assembly 406 can comprise one or more sockets and said two framing members can comprise one or more prongs capable attaching to said one or more sockets. In one embodiment, said one or more sockets can comprise a first socket 410a, a second socket 410b, a third socket 410c, and a fourth socket 410d. In one embodiment, said one or more prongs can comprise a first prong 412a, a second prong 412b, a third prong 412c, and a fourth prong 412d. In one embodiment, said second framing member 402b can comprise a set of said one or more prongs similar to said first framing member 402a, and said internal assembly 406 can accommodate said one or more prongs of said second framing member 402b. In one embodiment, attaching said first framing member 402a to said internal assembly 406 can comprise aligning, inserting and securing said one or more prongs into said one or more socket; wherein, said first socket 410a corresponds to said first prong 412a, said second socket 410b corresponds to said second prong 412b, said third socket 410c corresponds to said third prong 412c, and said fourth socket 410d corresponds to said fourth prong 412d. In one embodiment, said one or more external rotors can rotate freely around said internal assembly 406 and within a portion of said two framing members.

Figure 4C:
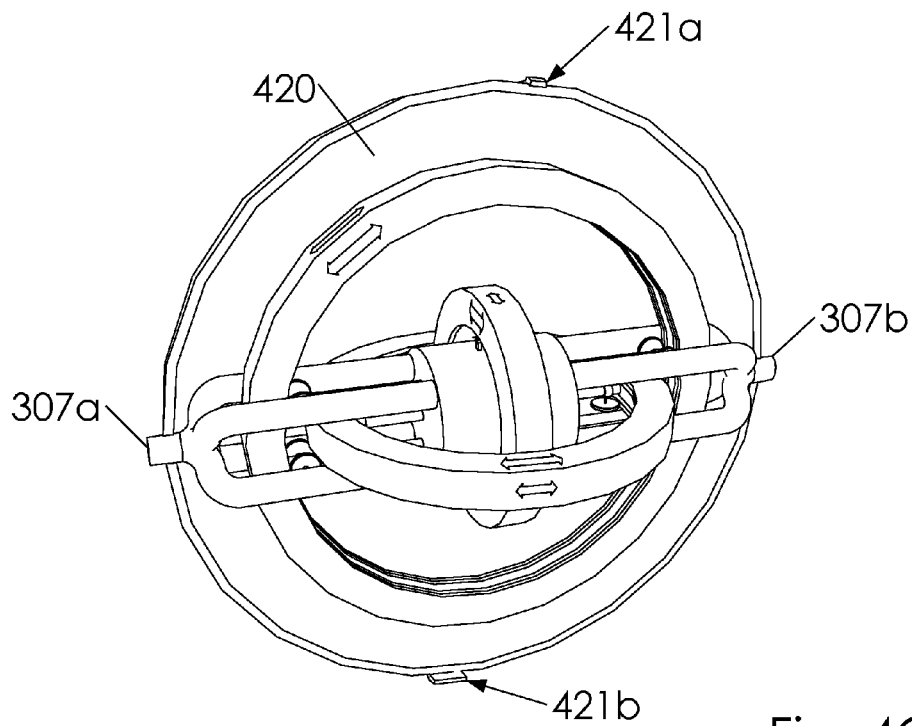
Figure 4D:
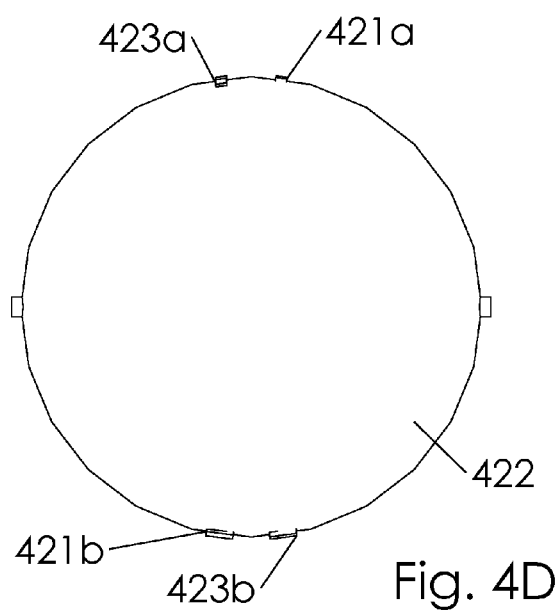
Figure 4E:
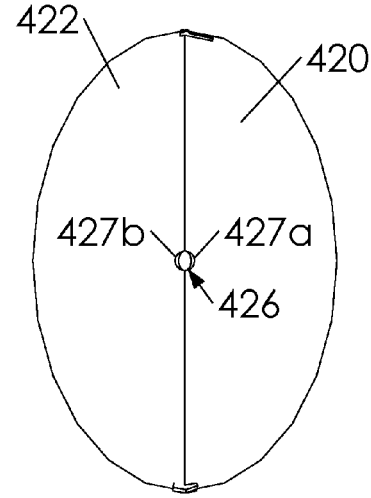

FIGS. 4C, 4D and 4E illustrate a perspective overview of said second gyroscopic assembly 104b with a first casing 420, an elevated front view and an elevated side view of said second gyroscopic assembly 104b with said first casing 420 and a second casing 422. In one embodiment, each of said one or more gyroscopic assemblies can comprise a casing assembly. For example, in one embodiment, said second gyroscopic assembly 104b can comprise said first casing 420 and said second casing 422. In one embodiment, said first casing 420 can comprise a first clip 421a and a second clip 421b, and said second casing 422 can comprise a first clip 423a and a second clip 423b. In one embodiment, said casing assembly can comprise an aperture for each of said two prongs of said two framing members. For example, in one embodiment, said apertures can be partially in said first casing 420 and said second casing 422. In one embodiment, a first case aperture 426 can comprise a first portion 427a in said first casing 420 and a second portion 427b in said second casing 422; wherein, a portion of said first portion 427a wraps around a portion said first prong 307a and a portion of said second portion 427b wraps around a remaining portion of said first prong 307a. In one embodiment, a similar aperture can be provided at said second prong 307b.

FIGS. 4F and 4G illustrate a perspective top side view of said first clip 421a and said first clip 423a, and a perspective bottom side view of said second clip 421b and said second clip 423b. In one embodiment, said casing assembly can comprise a clipping system to hold said first casing 420 and said second casing 422 closed comprising said first clip 421a, said second clip 421b, said first clip 423a, and said second clip 423b. In one embodiment, said first clip 421a can hold an upper portion of said second casing 422, said first clip 423a can hold an upper portion of said first casing 420, said second clip 421b can hold a lower portion of said second casing 422, and said second clip 423b can hold a portion of said first casing 420.

FIG. 4H illustrates said second gyroscopic assembly 104b on said animal 102 comprising said casing assembly. In one embodiment, said one or more gyroscopic assemblies can each comprise one of said casing assembly. In one embodiment, said one or more gyroscopic assemblies can be designed to comprise an aesthetic similar to other horse training equipment. For example, in one embodiment, said casing assembly can comprise a leather, wood, copper, aluminum or similar material so as to match other training elements used with said animal 102.

Figure 5A:
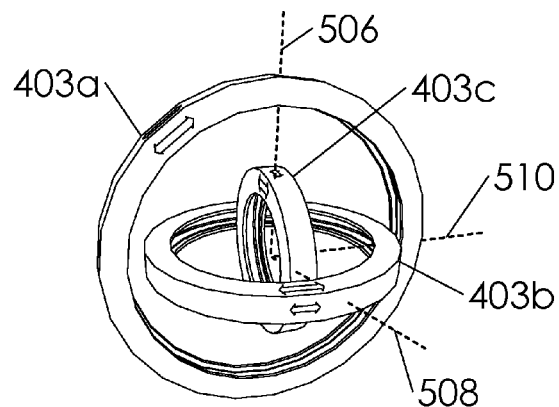
FIGS. 5A, 5B and 5C illustrate a perspective overview and an elevated cross-section front and top view of said second external rotor.
Figure 5B:
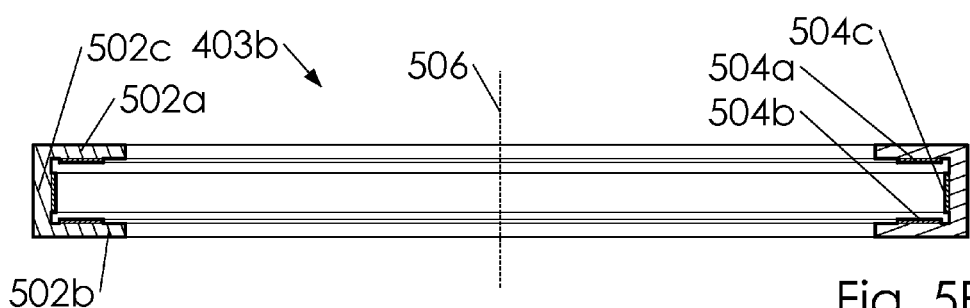
Figure 5C:
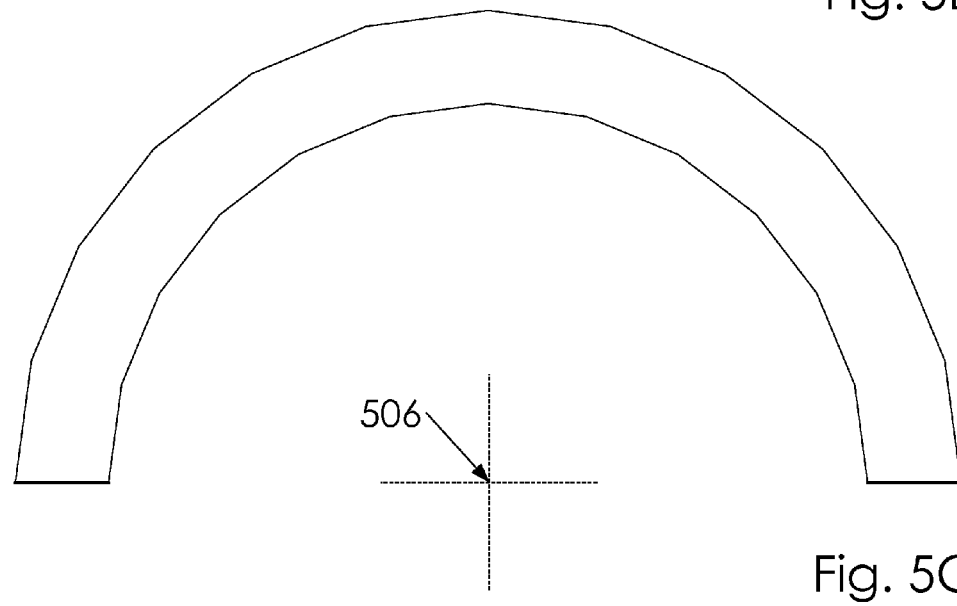

FIGS. 5A, 5B and 5C illustrate a perspective overview and an elevated cross-section front and top view of said second external rotor 403b. In one embodiment, said one or more external rotors can each have similar specifications to said second external rotor 403b, with the exception that each can have a unique internal and external diameter. In one embodiment, said second external rotor 403b can comprise a first side portion 502a, a second side portion 502b, and a third side portion 502c. In one embodiment, a cross-section of said second external rotor 403b can comprise a squared-U shape with an open end of said squared-U shape facing inward toward a center axis 506 of said second external rotor 403b. In one embodiment, said second external rotor 403b can be substantially circular (that is, round) about said third side portion 502c. In one embodiment, said first side portion 502a and said second side portion 502b can be substantially perpendicular to said third side portion 502c. In one embodiment, said second external rotor 403b can comprise a plurality of magnets about an inner surface of said squared-U shape. For example, in one embodiment, said first side portion 502a can comprise a first magnet 504a, said second side portion 502b can comprise a second magnet 504b, and said third side portion 502c can comprise a third magnet 504c. In one embodiment, said second external rotor 403b can rotate about said center axis 506. In one embodiment, said first external rotor 403a can comprise a center axis 508, said second external rotor 403b can comprise said center axis 506, and said third external rotor 403c can comprise a center axis 510.

Figure 5D:
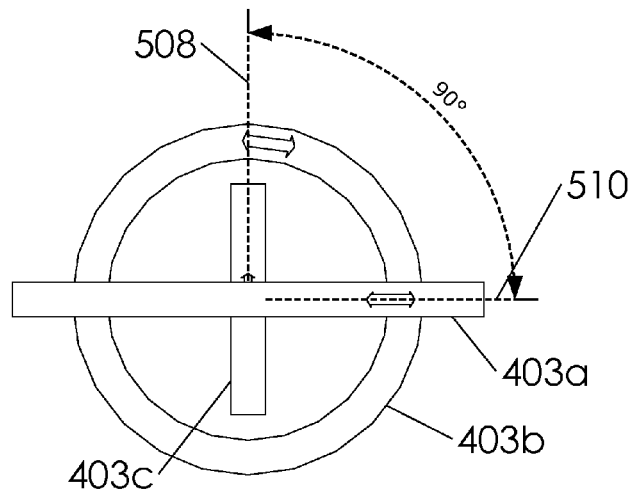
FIGS. 5D, 5E and 5F illustrate an elevated top view, an elevated front view, and an elevated side view of said one or more external rotors.
Figures 5E, 5F:
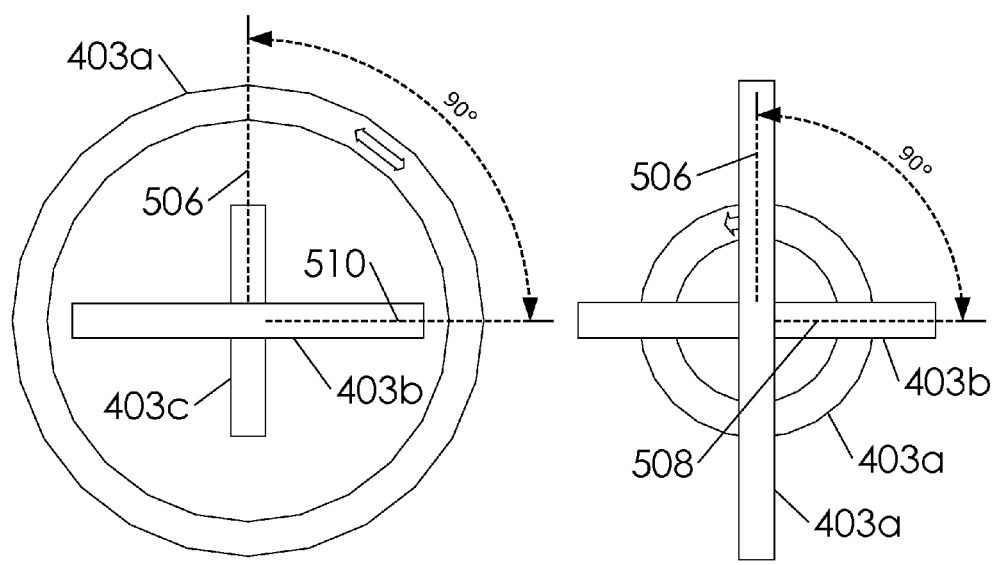
Figure 6A:
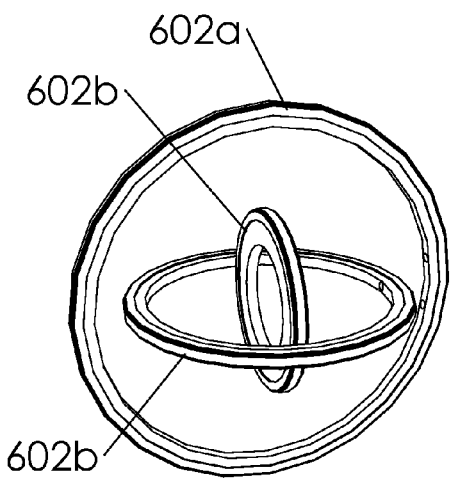
FIGS. 6A, 6B, 6C and 6D illustrate a perspective overview, an elevated top view, an elevated front view, and an elevated side view of one or more internal rails.
Figure 6B:
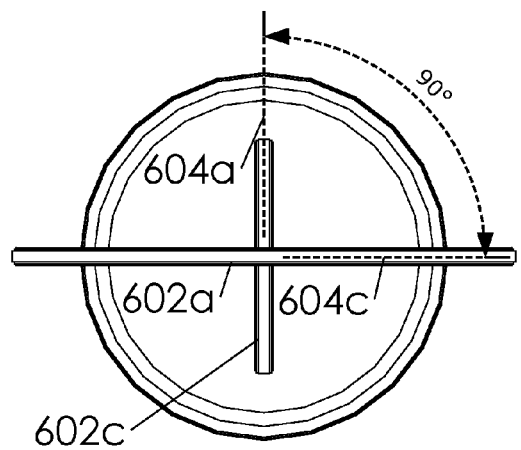
Figure 6D:
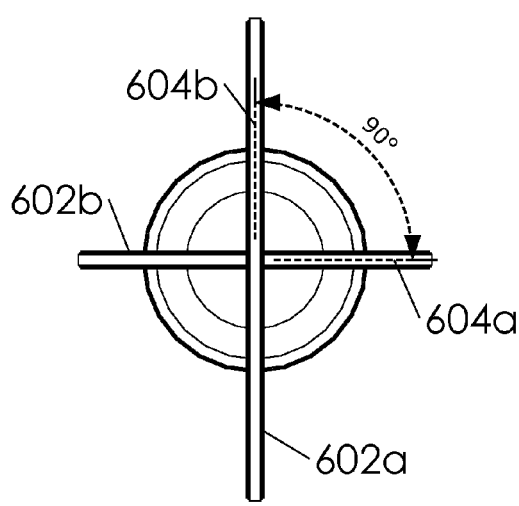
Figure 6C:
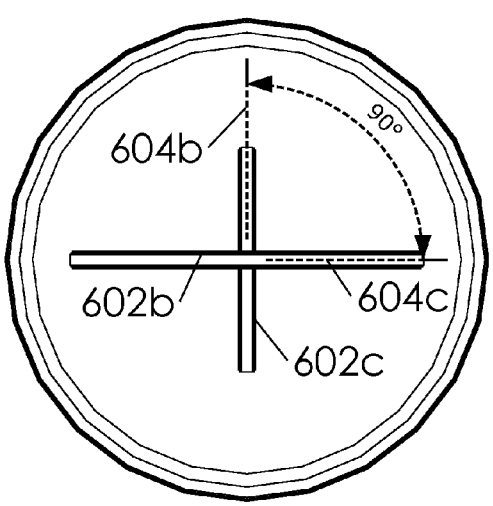
Figures 7A, 7B:
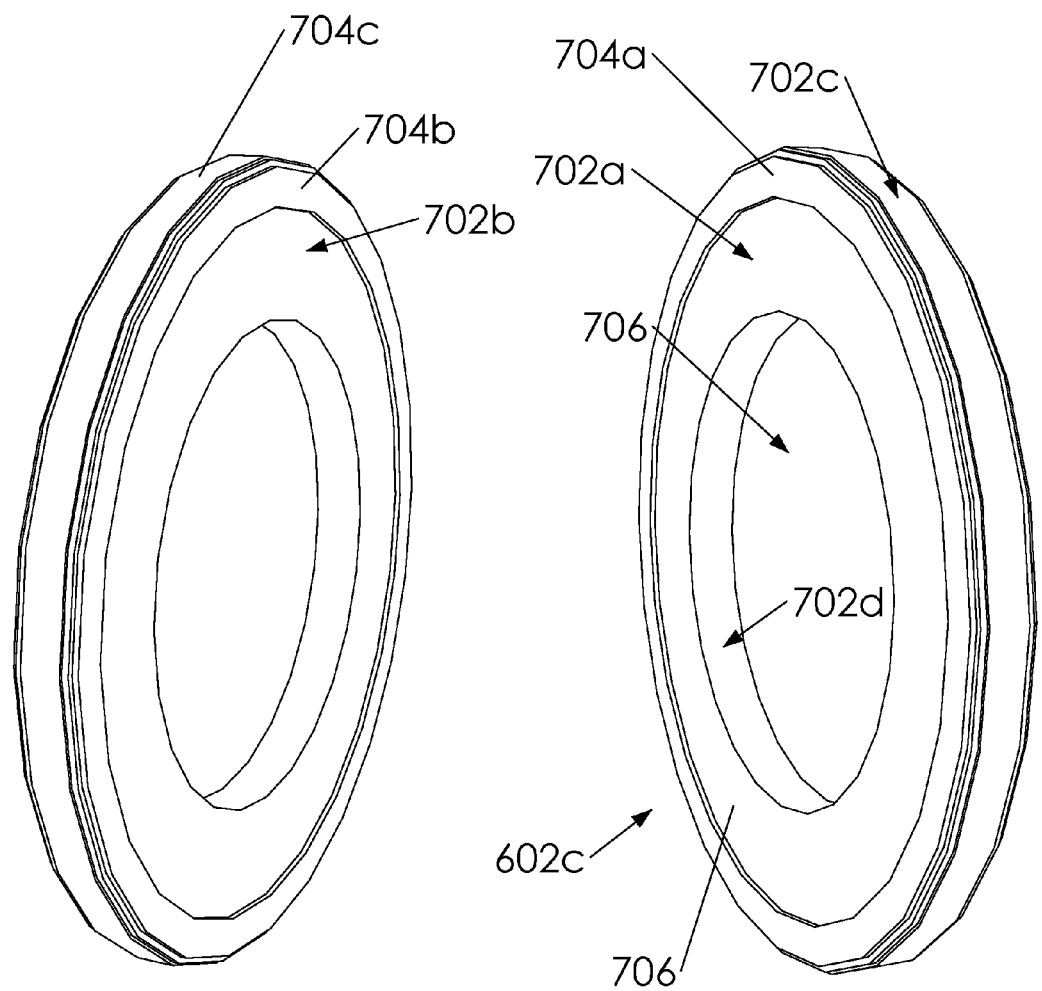
FIGS. 7A, 7B, 7C and 7D illustrate a perspective first side view, a perspective second side view, an elevated top view and an elevated front view of said third internal rail.
Figure 7C:
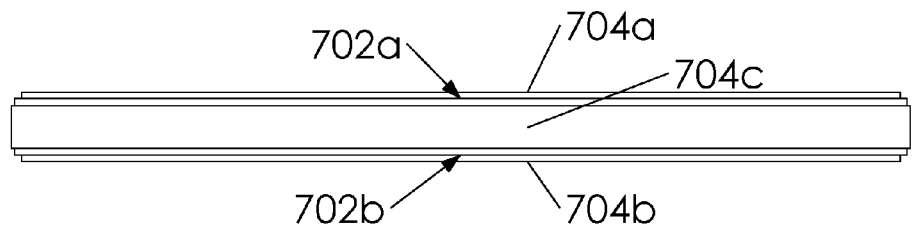
Figure 7D:
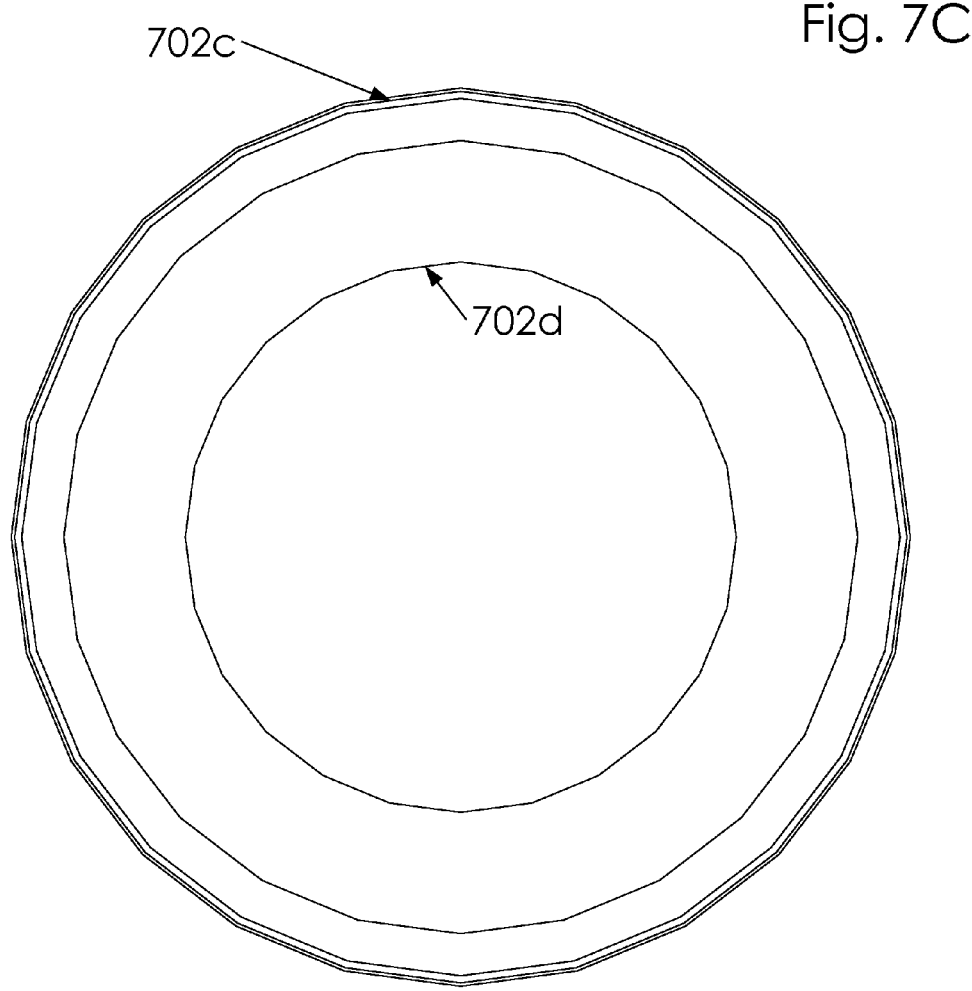

FIGS. 5D, 5E and 5F illustrate an elevated top view, an elevated front view, and an elevated side view of said one or more external rotors. In one embodiment, said center axis 508 can be perpendicular to said center axis 510. In one embodiment, said center axis 506 can be perpendicular to said center axis 510. In one embodiment, said center axis 506 can be perpendicular to said center axis 508. Thus, in one embodiment, with said one or more external rotors can be arranged on three axes with said center axis 508 as an x-axis, said center axis 510 as a y-axis, and said center axis 506 as a z-axis. Thus, in one embodiment said one or more external rotors can be arranged in a tri-axial configuration.

FIGS. 6A, 6B, 6C and 6D illustrate a perspective overview, an elevated top view, an elevated front view, and an elevated side view of one or more internal rails. In one embodiment, said one or more internal rails can correspond to said one or more external rotors and provide an internal track for each of said one or more external rotors to rotate upon. In one embodiment, said one or more internal rails can comprise a first internal rail 602a having a center axis 604a, a second internal rail 602b having a center axis 604b, and a third internal rail 602c having a center axis 604c. In one embodiment, said center axis 604a can be perpendicular to said center axis 604c. In one embodiment, said center axis 604b can be perpendicular to said center axis 604a. In one embodiment, said center axis 604b can be perpendicular to said center axis 604c.

FIGS. 7A, 7B, 7C and 7D illustrate a perspective first side view, a perspective second side view, an elevated top view and an elevated front view of said third internal rail 602c. In one embodiment, said third internal rail 602c (like the others among said one or more internal rails) can comprise a first side 702a, a second side 702b, an outer surface 702c, and an inner surface 702d. In one embodiment, said third internal rail 602c can comprise a plurality of magnets. In one embodiment, said plurality of magnets can comprise a first magnet 704a, a second magnet 704b, and a third magnet 704c. In one embodiment, said third internal rail 602c can comprise a body 706. In one embodiment, said plurality of magnets can be arranged around a perimeter of said third internal rail 602c. For example, in one embodiment, said plurality of magnets can be arranged with said first magnet 704a at said first side 702a, said second magnet 704b at said second side 702b, and said third magnet 704c around said outer surface 702c.

Figure 8A:
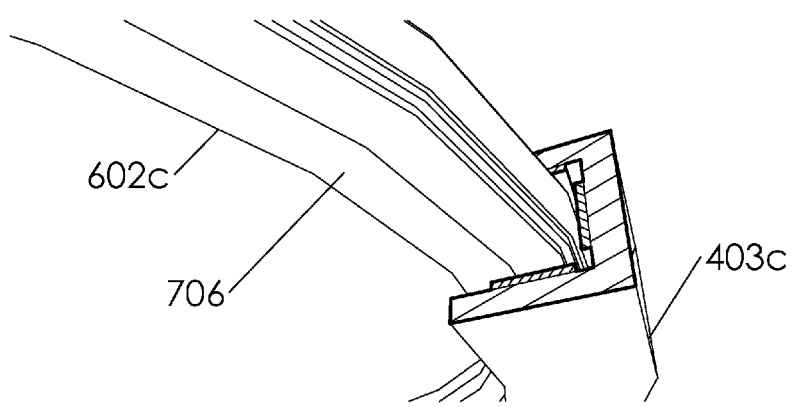
FIGS. 8A and 8B illustrate a perspective overview of said third internal rail within a cross-section view of said third external rotor, and an elevated cross-section view of said third internal rail and said third external rotor.
Figure 8B:
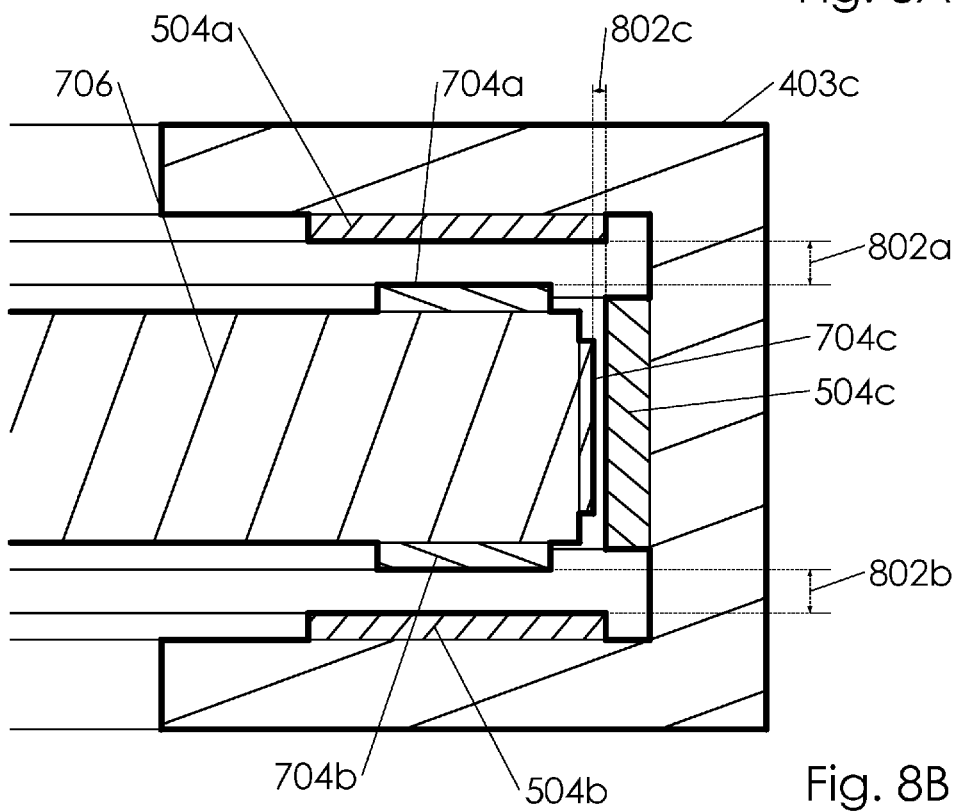

FIGS. 8A and 8B illustrate a perspective overview of said third internal rail 602c within a cross-section view of said third external rotor 403c, and an elevated cross-section view of said third internal rail 602c and said third external rotor 403c. In one embodiment, said one or more external rotors can fit around and rotate about said one or more internal rails. In one embodiment, said square-U shape of said one or more external rotors can fit about a portion of said body 706 of said one or more internal rails. In one embodiment, said one or more external rotors will rotate around said one or more internal rails on a magnetic bearing. In one embodiment, said magnetic bearing can comprise a set of magnetic materials arranged to push said plurality of magnets of said third internal rail 602c away from said plurality of magnets of said third external rotor 403c. For example, in one embodiment, said first magnet 704a can magnetically push away from said first magnet 504a with a magnetic gap 802a, said second magnet 704b can magnetically push away from said second magnet 504b with a magnetic gap 802b, and said third magnet 704c can magnetically push away from said third magnet 504c with a magnetic gap 802c.

Figure 9A:
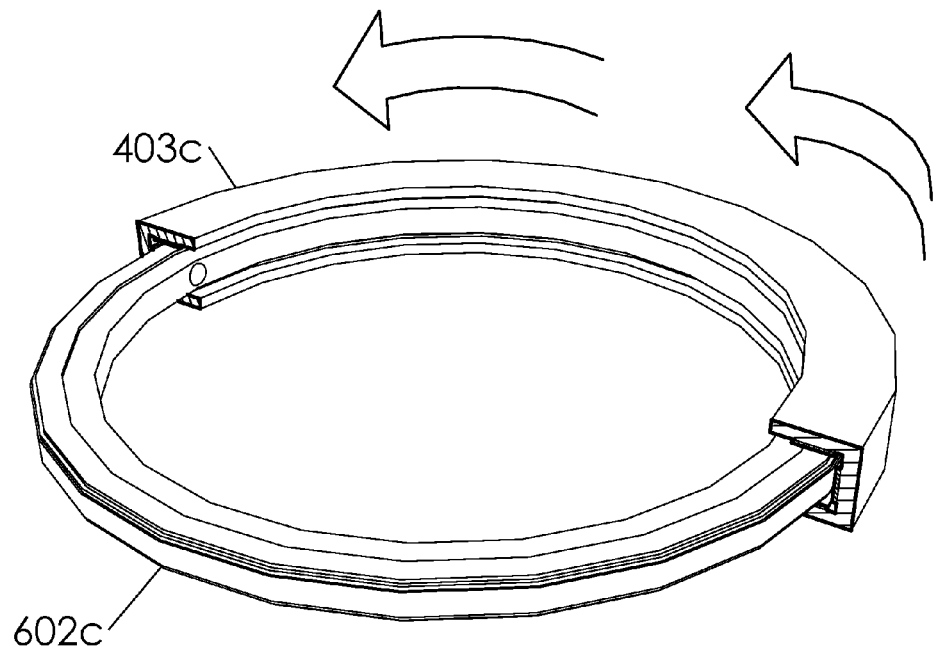
FIGS. 9A and 9B illustrate a perspective overview of a cross-section of said third external rotor arranged around said third internal rail and a perspective overview of said one or more gyroscopic assemblies.
Figure 9B:
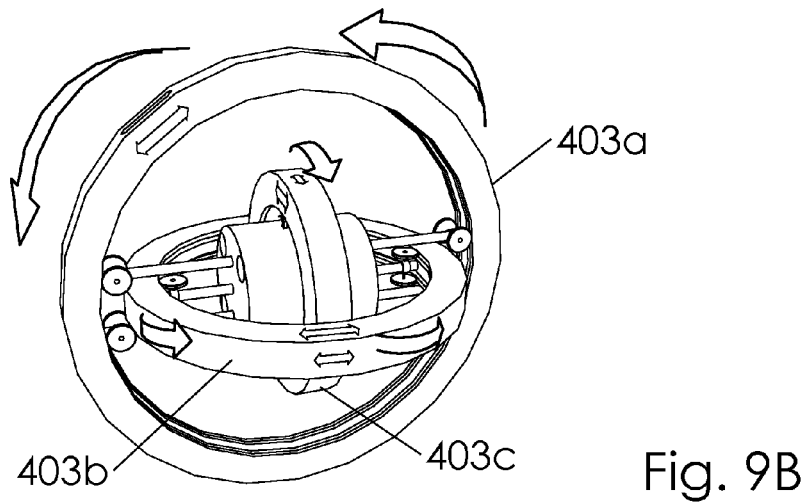

FIGS. 9A and 9B illustrate a perspective overview of a cross-section of said third external rotor 403c arranged around said third internal rail 602c and a perspective overview of said one or more gyroscopic assemblies. In one embodiment, said one or more external rotors can rotate about said one or more internal rails. Thus, in one embodiment said one or more external rotors rotating about said one or more internal rails can comprise a three axis gyroscope in three perpendicular planes. In one embodiment, said three axis gyroscope can comprise ball bearings or other more conventional bearings.

Figure 10A:
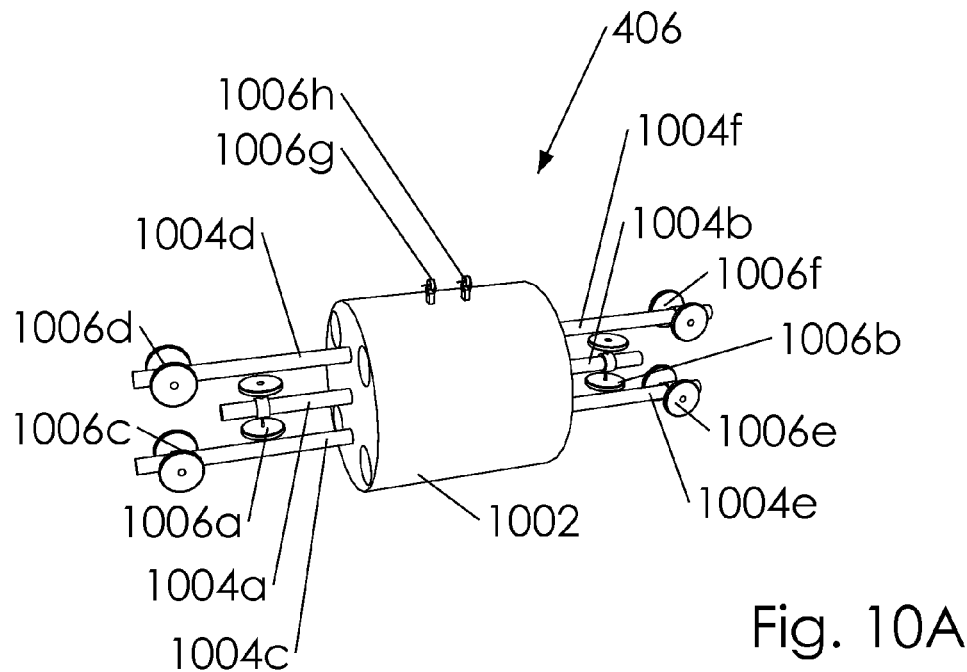
FIGS. 10A and 10B illustrate said a perspective overview of said internal assembly and said internal assembly with said one or more internal rails.
Figure 10B:
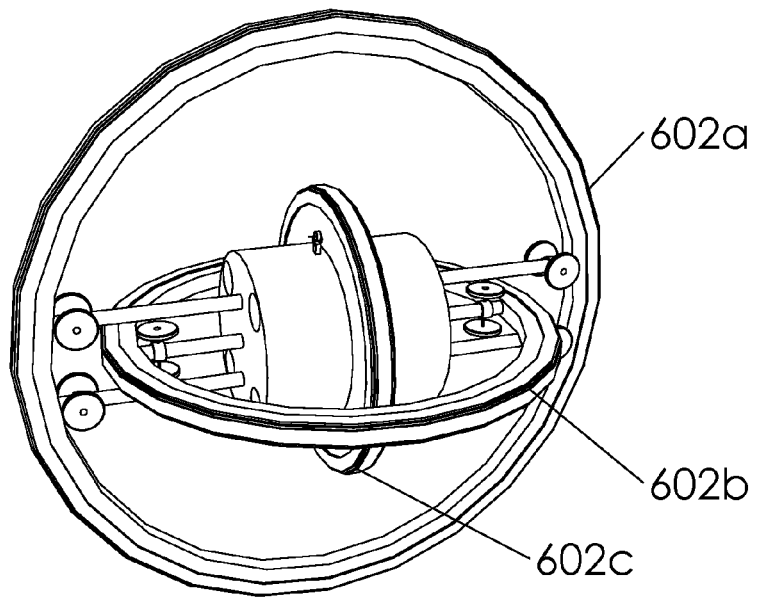

FIGS. 10A and 10B illustrate said a perspective overview of said internal assembly 406 and said internal assembly 406 with said one or more internal rails. In one embodiment, said internal assembly 406 can comprise a central portion 1002, one or more legs, and one or more wheels. In one embodiment, said central portion 1002 can comprise one or more batteries (not illustrated). In one embodiment, said one or more wheels can be arranged around an exterior ends of said one or more legs. In one embodiment, said one or more wheels can be used to drive said one or more external rotors (as discussed below). In one embodiment, said one or more wheels can be connected to said one or more batteries (not illustrated) which can be stored in said central portion 1002. In one embodiment, said one or more wheels can be selectively driven at a variable speed and with a variable duration by a controller (not illustrated). In one embodiment, said one or more legs can comprise a first leg 1004a, a second leg 1004b, a third leg 1004c, a fourth leg 1004d, a fifth leg 1004e and a sixth leg 1004f. In one embodiment, said internal assembly 406 can be arranged to connect said one or more internal rails to one another and to said base portion 205 with said two framing members. In one embodiment, said third internal rail 602c can attach to said central portion 1002; said central portion 1002 can attach to said second internal rail 602b with said first leg 1004a and said second leg 1004b; and said central portion 1002 can attach to said first internal rail 602a with said third leg 1004c, said fourth leg 1004d, said fifth leg 1004e and said sixth leg 1004f. In one embodiment, said one or more wheels can comprise a first wheel assembly 1006a, a second wheel assembly 1006b, a third wheel assembly 1006c, a fourth wheel assembly 1006d, a fifth wheel assembly 1006e and a sixth wheel assembly 1006f.

Figure 10C:
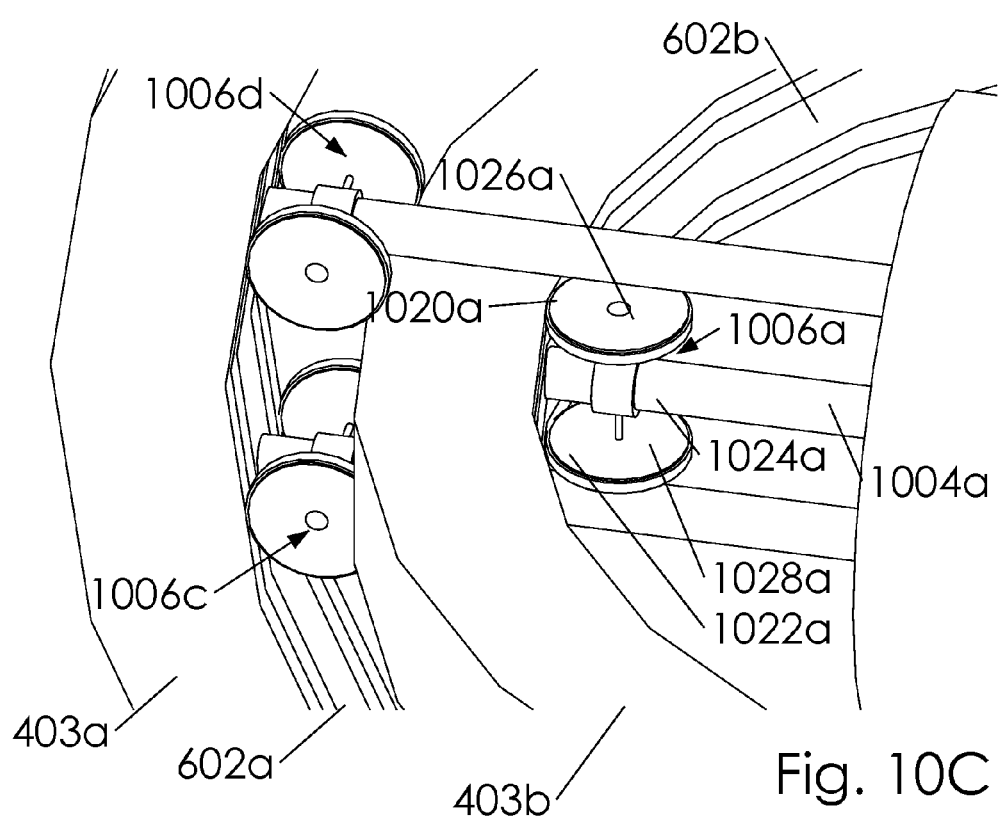
FIGS. 10C and 10D illustrate said one or more wheels interfacing with said one or more external rotors.
Figure 10D:
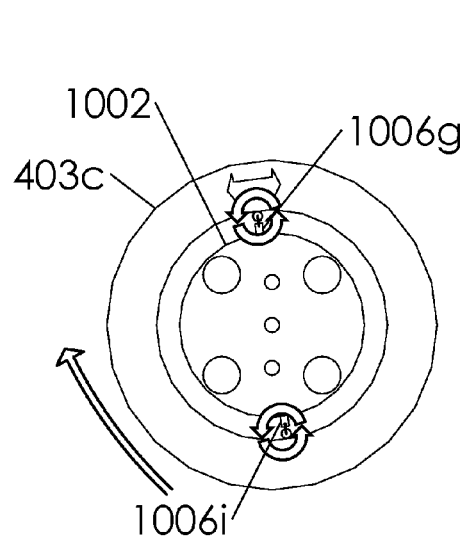

FIGS. 10C and 10D illustrate said one or more wheels interfacing with said one or more external rotors. In one embodiment, wheel assemblies 1006a-1006f can each comprise a pair of motor driven wheels mounted to a leg collar. For example, in one embodiment, said first wheel assembly 1006a can comprise a first wheel 1020a, a second wheel 1022a, a leg collar 1024a, and a first mounting bracket 1026a and a second mounting bracket 1028a. In one embodiment, said first wheel 1020a and said second wheel 1022a can be driven by an electric motor, steam engine or gas engine (not illustrated but well known in the art). In one embodiment, said gas engine can operate on petrol, propane or similar. In one embodiment, said electric motor can be powered by said one or more batteries in said central portion 1002. In one embodiment, said leg collar 1024a can attach to said first leg 1004a. In one embodiment, said first mounting bracket 1026a and said second mounting bracket 1028a can attach to said leg collar 1024a. In one embodiment, said animal first wheel 1020a can attach to said first mounting bracket 1026a, and said second wheel 1022a can attach to said second mounting bracket 1028a. In one embodiment, said first wheel assembly 1006a can hold said first wheel 1020a and said second wheel 1022a against said second external rotor 403b. Likewise, said one or more wheels can be held against said one or more external rotors. In one embodiment, driving said first wheel 1020a and said second wheel 1022a can cause said second external rotor 403b to rotate relative to said second internal rail 602b.

Figure 10E:
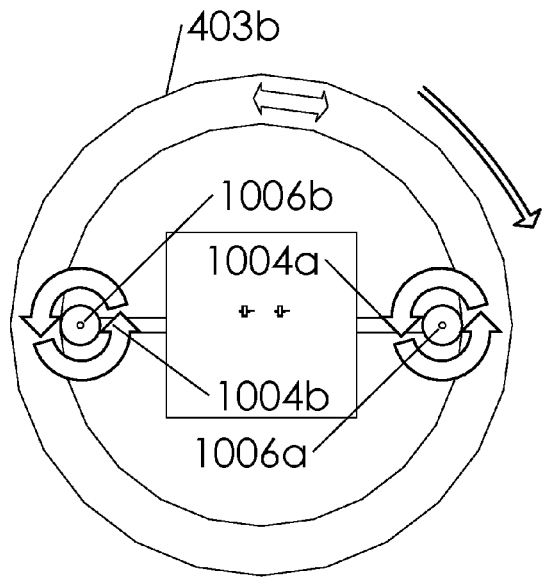
Figure 10F:
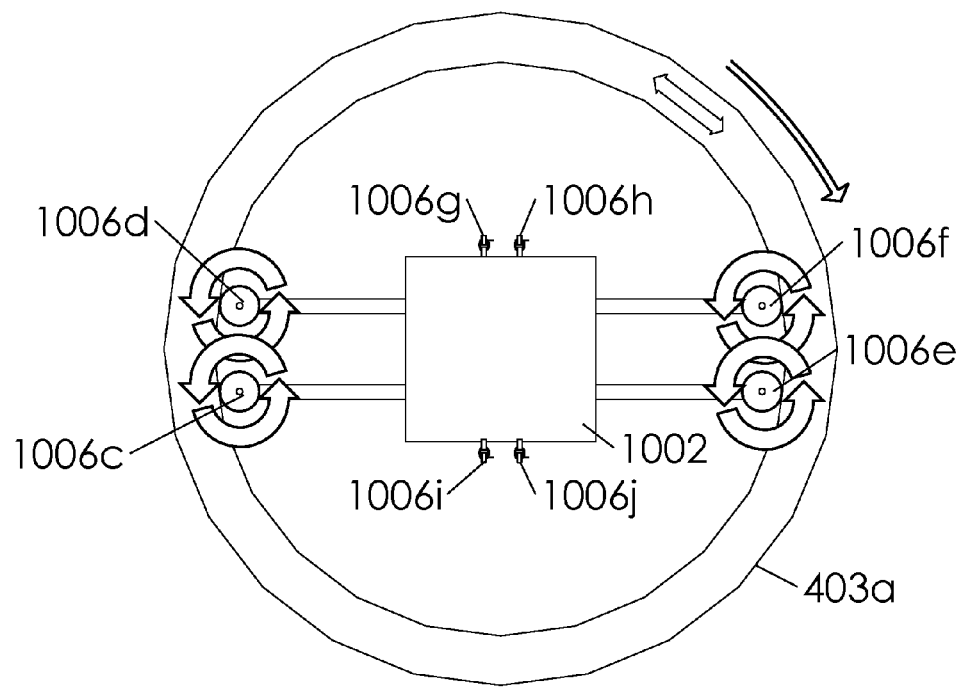

FIGS. 10D, 10E and 10F illustrate an elevated side view of said third external rotor 403c with said central portion 1002; an elevated top view of said central portion 1002 with said second external rotor 403b, said first leg 1004a and said second leg 1004b; and an elevated front view of said central portion 1002 with said third leg 1004c, fourth leg 1004d, said fifth leg 1004e, said sixth leg 1004f and said first external rotor 403a. In one embodiment, said one or more wheels can further comprise a ninth wheel assembly 1006i and a tenth wheel assembly 1006j (as illustrated in FIGS. 10D and 10F). In one embodiment, wheel assemblies 1006g-1006i can be arranged around said central portion 1002 and press against a portion of said third external rotor 403c. In one embodiment, said first wheel assembly 1006a and said second wheel assembly 1006b can press against a portion of said second external rotor 403b. And, in one embodiment, said third wheel assembly 1006c, fourth wheel assembly 1006d, said fifth wheel assembly 1006e, and said sixth wheel assembly 1006f can press against a portion of said first external rotor 403a. Accordingly, in one embodiment, said one or more wheels can be arranged so as to press against each of said one or more external rotors. In one embodiment, said one or more wheels can be used for driving said one or more external rotors around said one or more internal rails. In one embodiment, said driving of said one or more external rotors can create a set of gyroscopic forces within said second gyroscopic assembly 104b.

Figure 11A:
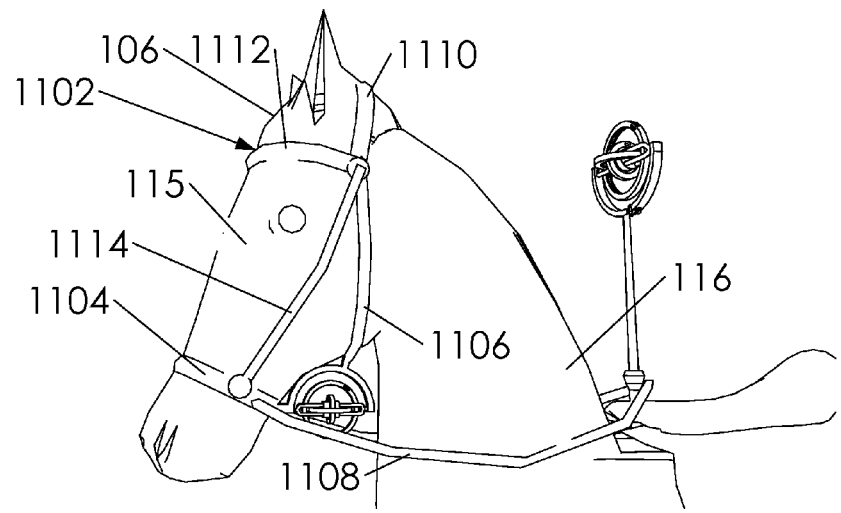
FIGS. 11A and 11B illustrate a perspective front overview of said, and a detailed perspective front overview of said first gyroscopic assembly.
Figure 11B:
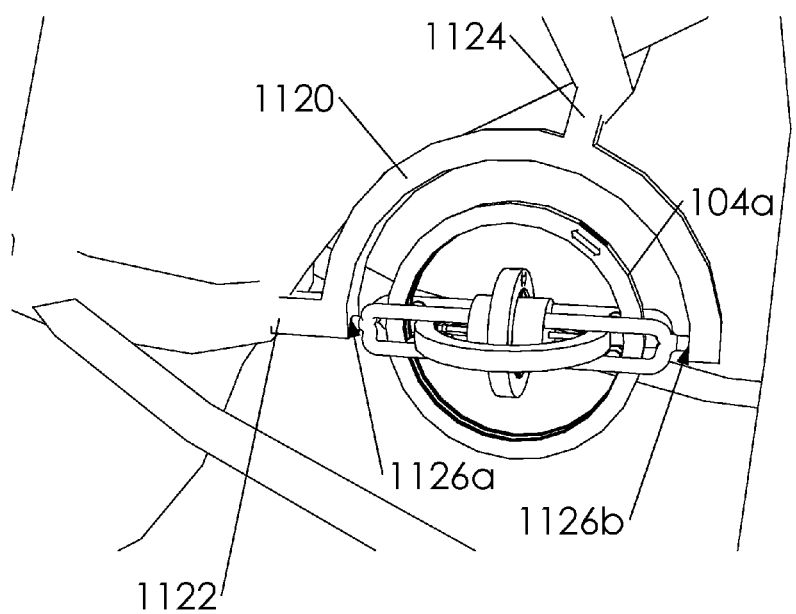

FIGS. 11A and 11B illustrate a perspective front overview of said 102, and a detailed perspective front overview of said first gyroscopic assembly 104a. In one embodiment, a portion of said animal training system 100 can attach to said head 106 of said animal 102. In one embodiment, said animal 102 can be trained with a bridle 1102. In one embodiment, said bridle 1102 can comprise a noseband 1104, a throat-lash 1106, one or more reins 1108, a headpiece 1110, a brow-band 1112 and a cheek piece 1114. In one embodiment, said first gyroscopic assembly 104a can attach to said head 106 of said animal 102 with a gyroscope bracket 1120 attached to a portion of said bridle 1102. In one embodiment, said gyroscope bracket 1120 can comprise a first anchor 1122 attached to said noseband 1104, and a second anchor 1124 attached to said throat-lash 1106. In one embodiment, said gyroscope bracket 1120 can comprise a pair of sockets comprising a first socket 1126a and a second socket 1126b. Similar to said gyroscope bracket 204, said pair of sockets in said gyroscope bracket 1120 can receive a two prongs in said first gyroscopic assembly 104a.

Figure 12A:
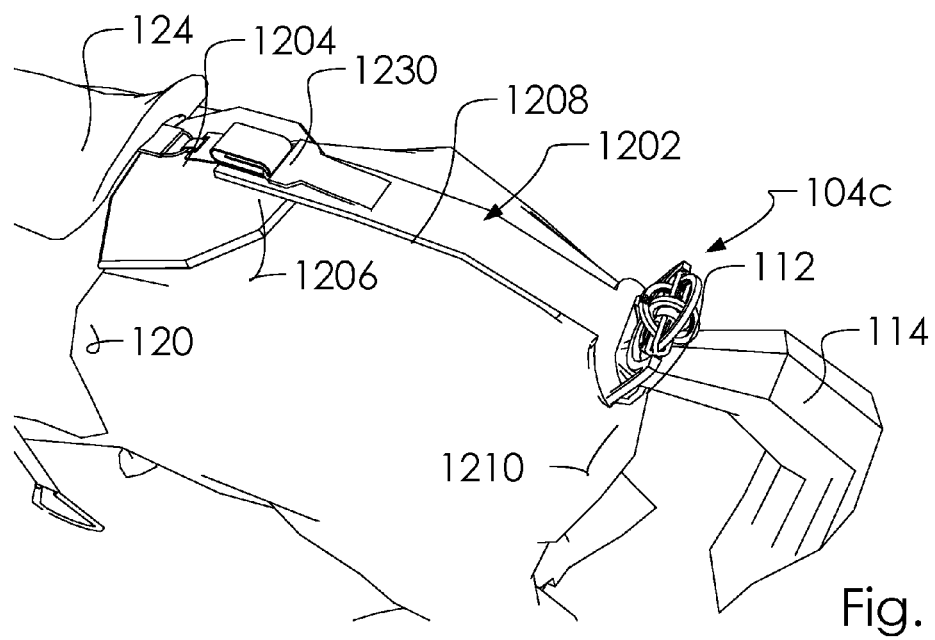
FIGS. 12A and 12B illustrate a perspective overview and perspective top view of said third gyroscopic assembly.
Figure 12B:
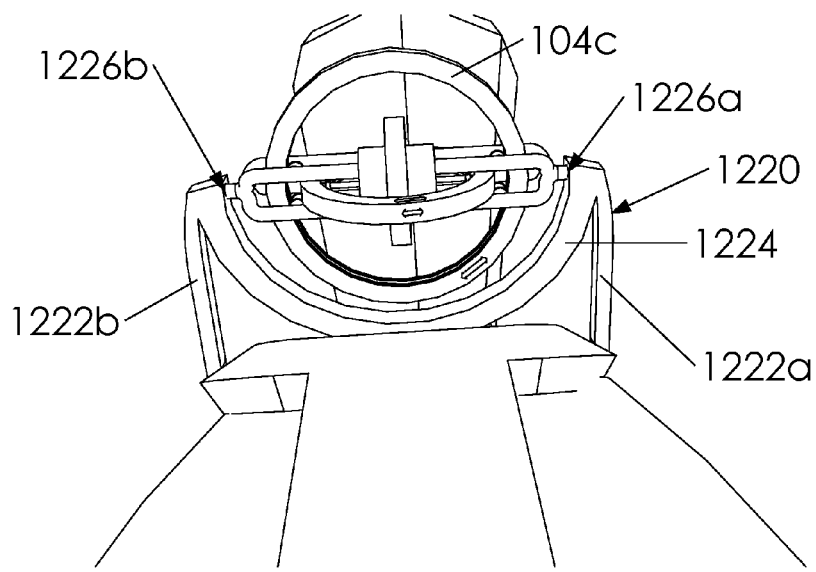

FIGS. 12A and 12B illustrate a perspective overview and perspective top view of said third gyroscopic assembly 104c. In one embodiment, said third gyroscopic assembly 104c can attach to said animal 102 with a tail strap assembly 1202. In one embodiment, said tail strap assembly 1202 can comprise a hook 1204 attached to said seat 124, a strap 1206 attaching said hook 1204 to a base portion 1208, and a looping portion 1210 around said tail head 112 of said tail 114 of said animal 102. In one embodiment, said tail strap assembly 1202 can be held in tension between said seat 124 and said tail 114.

In one embodiment, said third gyroscopic assembly 104c can attach to said tail strap assembly 1202 with a gyroscope bracket 1220. In one embodiment, said gyroscope bracket 1220 can attach to said tail strap assembly 1202 at said looping portion 1210. In one embodiment, said gyroscope bracket 1220 can attach at, near or around said tail head 112. In one embodiment, said third gyroscopic assembly 104c can apply a set of gyroscopic forces around said tail head 112 when engaged. In one embodiment, said gyroscope bracket 1220 can comprise a first side portion 1222a, a second side portion 1222b, a central portion 1224, and a pair of sockets. In one embodiment, said pair of sockets can comprise a first socket 1226a and a second socket 1226b. Similar to said gyroscope bracket 204 and said gyroscope bracket 1120, said gyroscope bracket 1220 can comprise a two prongs in said third gyroscopic assembly 104c. In one embodiment, said central portion 1224 can comprise a "U" shape capable of accommodating said third gyroscopic assembly 104c without interfering with its operation.

In one embodiment, said saddle 120 can comprise a battery bag 1230 behind said seat 124. In one embodiment, said battery bag 1230 can comprise a storage area for batteries, or in another embodiment, one or more wires can attach said battery bag 1230 to said one or more gyroscopic assemblies in order to provide a power source to said one or more gyroscopic assemblies from a central location. In one embodiment, storing said batteries at said battery bag 1230 can distribute the weight of said one or more batteries to said back 118 of said animal 102.

In one embodiment, said power source can attach to a one or more engines (not illustrated), said one or more engines can transmit a torque and/or rotation to said one or more external rotor. In one embodiment, said power source can comprise said batteries and said one or more engines can comprise one or more electric motors. In one embodiment, said power source can comprise a gas tank and said one or more engines can comprise one or more internal combustion engines. In one embodiment, said power source can comprise a steam reservoir and said one or more engines can comprise one or more steam engines. Other methods of generating a torque with said one or more engines and said power source are known in the art and are incorporated by reference here.

In one embodiment, said animal training system 100 can comprise a one or more gyroscope brackets capable of attaching said one or more gyroscopic assemblies to said animal 102. In one embodiment, said one or more gyroscope brackets can comprise said gyroscope bracket 204, said gyroscope bracket 1120 and/or said gyroscope bracket 1220.

Figure 13:
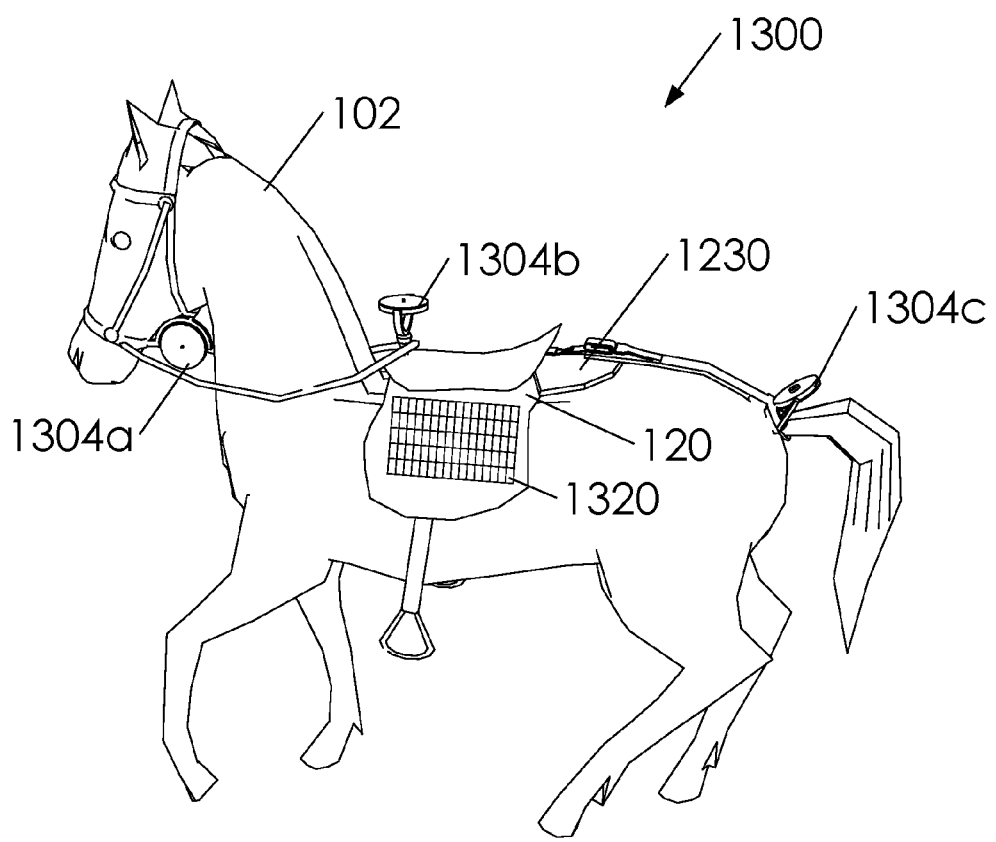
FIG. 13 illustrates a perspective overview of said animal with an animal training system.
Figure 14A:
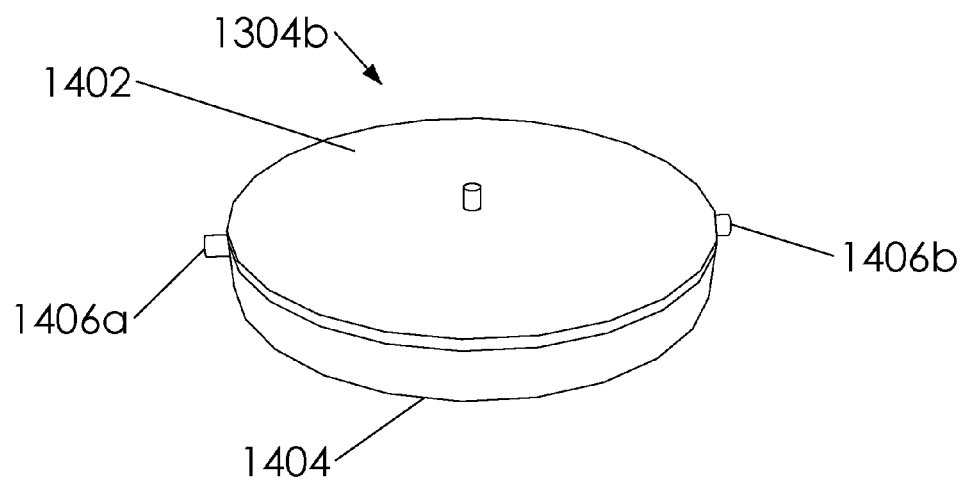
FIGS. 14A, 14B, 14C and 14D illustrate a perspective overview of said second gyroscopic assembly without a gyroscope bracket, a view with said gyroscope bracket, an elevated side view and an elevated front view with said gyroscope bracket.
Figure 14B:
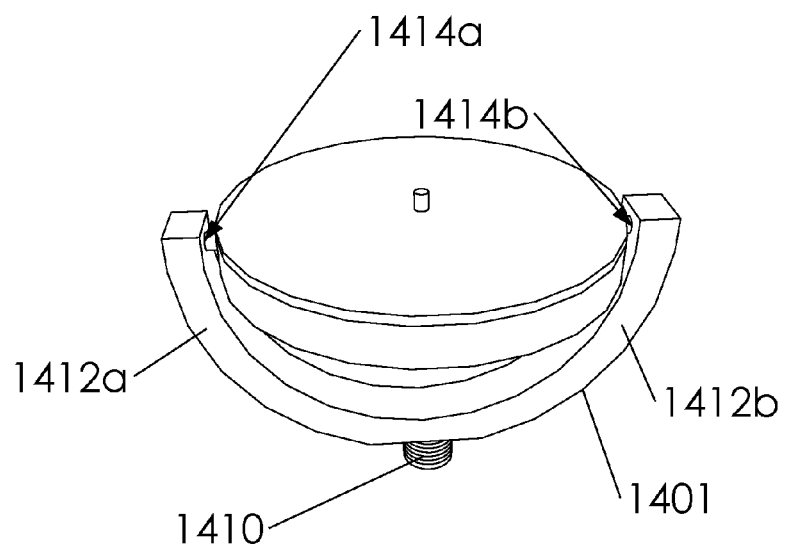
Figure 14C:
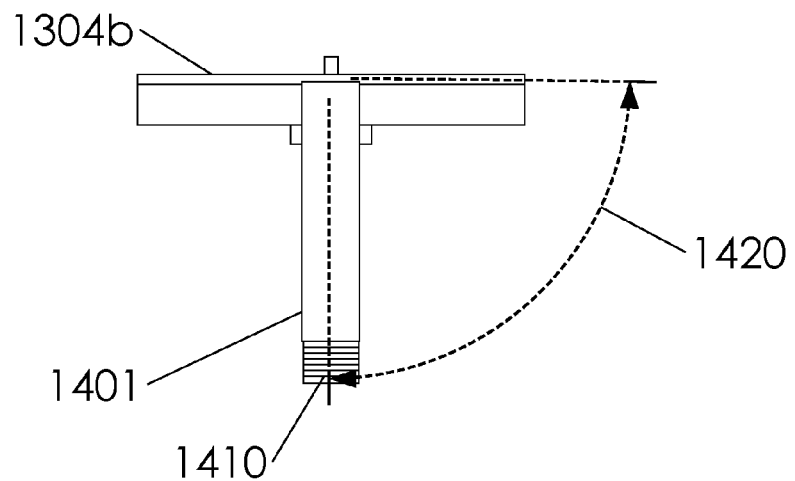
Figure 14D:
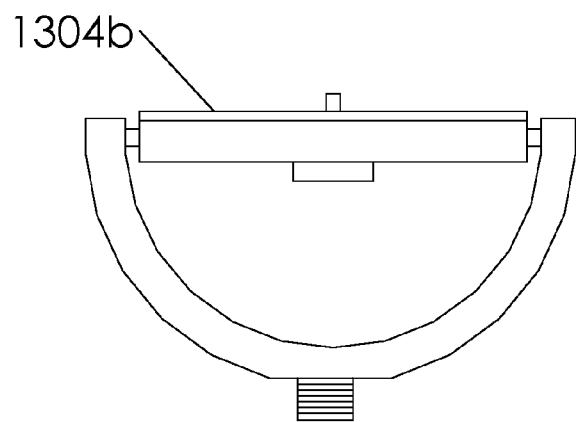

FIG. 13 illustrates a perspective overview of said animal 102 with an animal training system 1300. In one embodiment, said animal training system 1300 can comprise an alternative embodiment of said one or more gyroscopic assemblies. In one embodiment, said one or more gyroscopic assemblies can comprise a first gyroscopic assembly 1304a, a second gyroscopic assembly 1304b and a third gyroscopic assembly 1304c.

In one embodiment, said animal training system 100 and said animal training system 1300 can comprise a one or more solar panels 1320 on said saddle 120 of said animal 102. In one embodiment, said one or more solar panels 1320 can charge one or more batteries in said battery bag 1230 or provide energy to said one or more gyroscopic assemblies.

FIGS. 14A, 14B, 14C and 14D illustrate a perspective overview of said second gyroscopic assembly 1304b without a gyroscope bracket 1401, a view with said gyroscope bracket 1401, an elevated side view and an elevated front view with said gyroscope bracket 1401. In one embodiment, said one or more gyroscopic assemblies can be substantially similar to said second gyroscopic assembly 1304b. In one embodiment, said second gyroscopic assembly 1304b, can comprise an upper casing 1402, a lower casing 1404, a first prong 1406a and a second prong 1406b. In one embodiment, said first prong 1406a and said second prong 1406b can comprise a two prongs of said second gyroscopic assembly 1304b. In one embodiment, said gyroscope bracket 1401 can comprise a base 1410, a first side 1412a, a second side 1412b, a first socket 1414a and a second socket 1414b. In one embodiment, said first socket 1414a and said second socket 1414b can comprise a two sockets of said gyroscope bracket 1401. In one embodiment, said second gyroscopic assembly 1304b can mount to said gyroscope bracket 1401. In one embodiment, mounting said second gyroscopic assembly 1304b to said gyroscope bracket 1401 can comprise aligning and attaching said two prongs of said second gyroscopic assembly 1304b to said two sockets of said gyroscope bracket 1401. In one embodiment, said gyroscope bracket 1401 can comprise a "U" shape having said first side 1412a and said second side 1412b as its component sides. In one embodiment, said first socket 1414a can comprise an aperture through a portion of said first side 1412a; likewise, said second socket 1414b can comprise an aperture through a portion of said second socket 1414b. In one embodiment, said base 1410 can attach to a bottom portion of said base 1410. In one embodiment, said base 1410 can comprise an external threading 1411. In one embodiment, said base 1410 can attach to said horn 122. In one embodiment, attaching said 1410 to said horn 122 can comprise screwing said external threading 1411 into said internal threading 210.

In one embodiment, said second gyroscopic assembly 1304b can be substantially planar. In one embodiment, said second gyroscopic assembly 1304b can attach to said gyroscope bracket 1401 at a relative angle 1420 between said base 1410 and said one or more gyroscopic assemblies. In one embodiment, said relative angle 1420 can comprise a perpendicular angle or said relative angle 1420 can be parallel between said base 1410 and said second gyroscopic assembly 1304b. In one embodiment, said relative angle 1420 can be fixed such that said second gyroscopic assembly 1304b does not spin upon said two prongs of said second gyroscopic assembly 1304b.

Figure 15A:
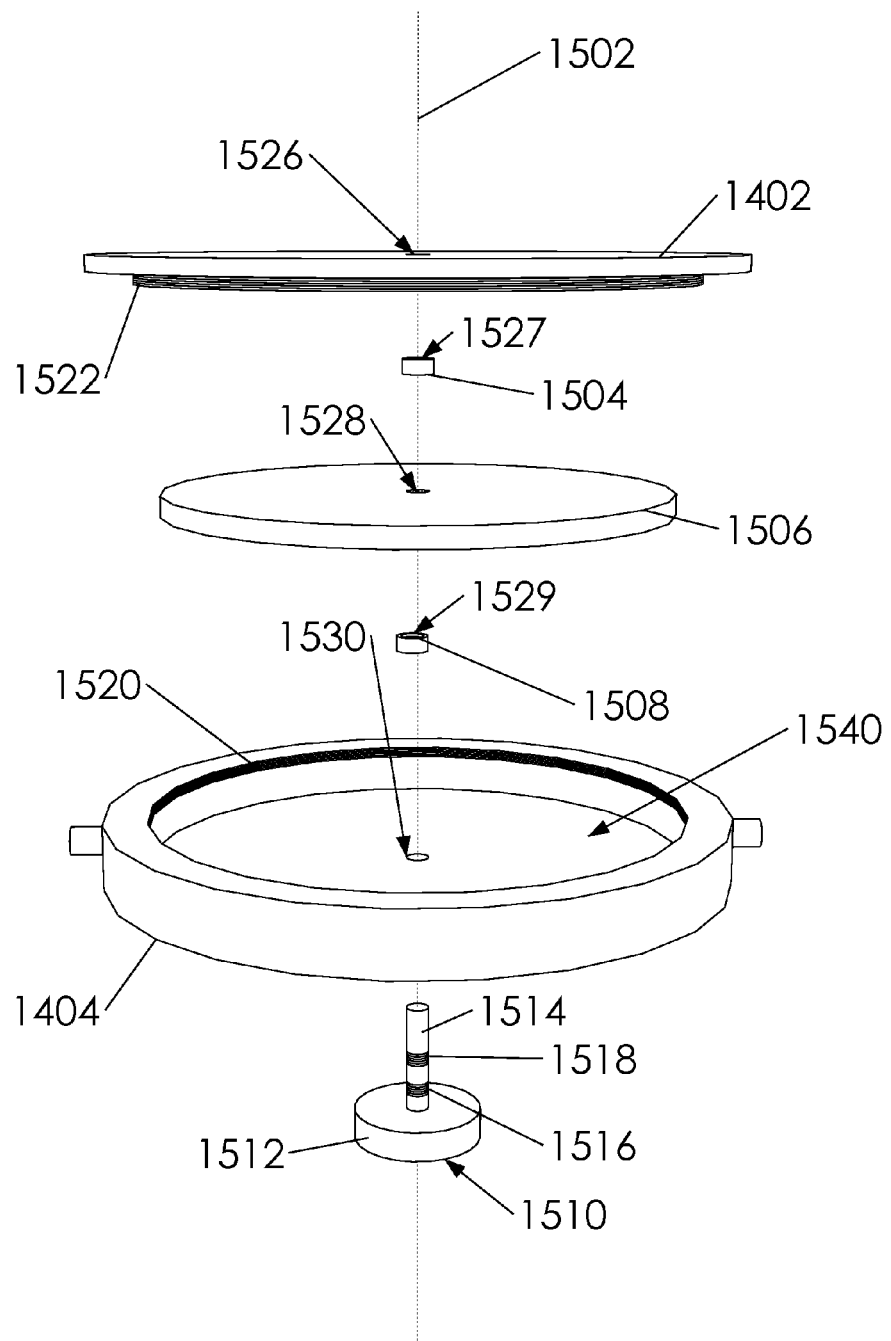
FIGS. 15A, 15B and 15C illustrate a perspective exploded overview and an elevated front side view of said second gyroscopic assembly, and a partially assembled perspective overview of said second gyroscopic assembly without said upper casing.
Figure 15B:
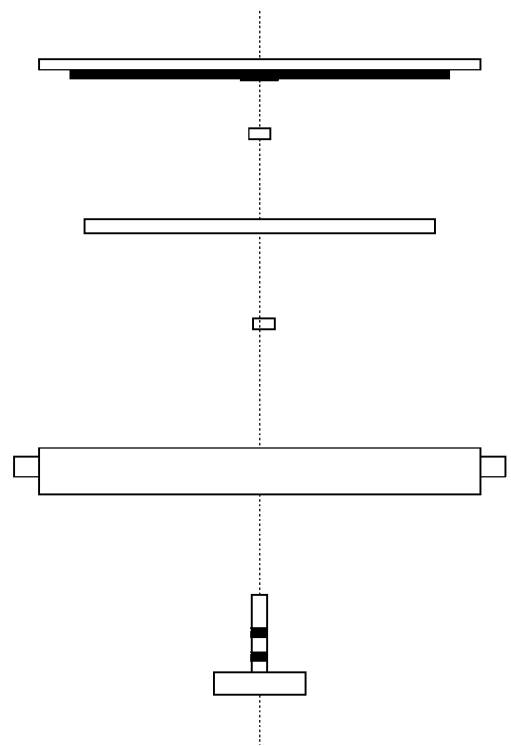
Figure 15C:
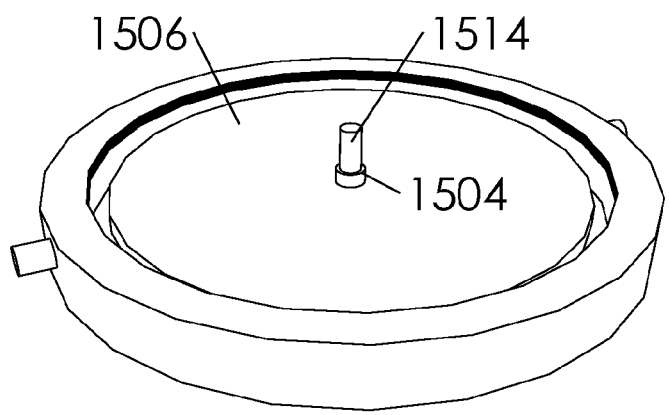

FIGS. 15A, 15B and 15C illustrate a perspective exploded overview and an elevated front side view of said second gyroscopic assembly 1304b, and a partially assembled perspective overview of said second gyroscopic assembly 1304b without said upper casing 1402. In one embodiment, said second gyroscopic assembly 1304b (or any of said one or more gyroscopic assemblies) can be assembled by aligning its parts on a central axis 1502. In one embodiment, said second gyroscopic assembly 1304b can comprise said upper casing 1402, a first bolt 1504, a gyro disk 1506, a second bolt 1508, a motor 1510, said lower casing 1404, a base 1512, a shaft 1514, a first threading 1516, and a second threading 1518. In one embodiment, said upper casing 1402 can comprise an external threading 1522. In one embodiment, said lower casing 1404 can comprise an internal threading 1520. In one embodiment, said shaft 1514 can align with said central axis 1502 and slide through a portion of each of said upper casing 1402 at an aperture 1526, said first bolt 1504 at an aperture 1527, said gyro disk 1506 at an aperture 1528, said second bolt 1508 at an aperture 1529, and said lower casing 1404 at an aperture 1530. In one embodiment, said second bolt 1508 can attach to said first threading 1516. In one embodiment, said first bolt 1504 can attach to said second threading 1518. In one embodiment, said gyro disk 1506 can be held between said first bolt 1504 and said second bolt 1508. In one embodiment, said shaft 1514 can rotate independent of said base 1512. In one embodiment, said shaft 1514 can rotate freely within a cavity 1540 between said upper casing 1402 and said lower casing 1404. In one embodiment, said upper casing 1402 can attach to said lower casing 1404 with said external threading 1522 and said internal threading 1520. In one embodiment, attaching said upper casing 1402 to said lower casing 1404 can comprise screwing said external threading 1522 into said internal threading 1520. In one embodiment, said second gyroscopic assembly 1304*b* need not have said gyro disk 1506 within said upper casing 1402 and said lower casing 1404 to achieve its design goals.

Figure 16A:
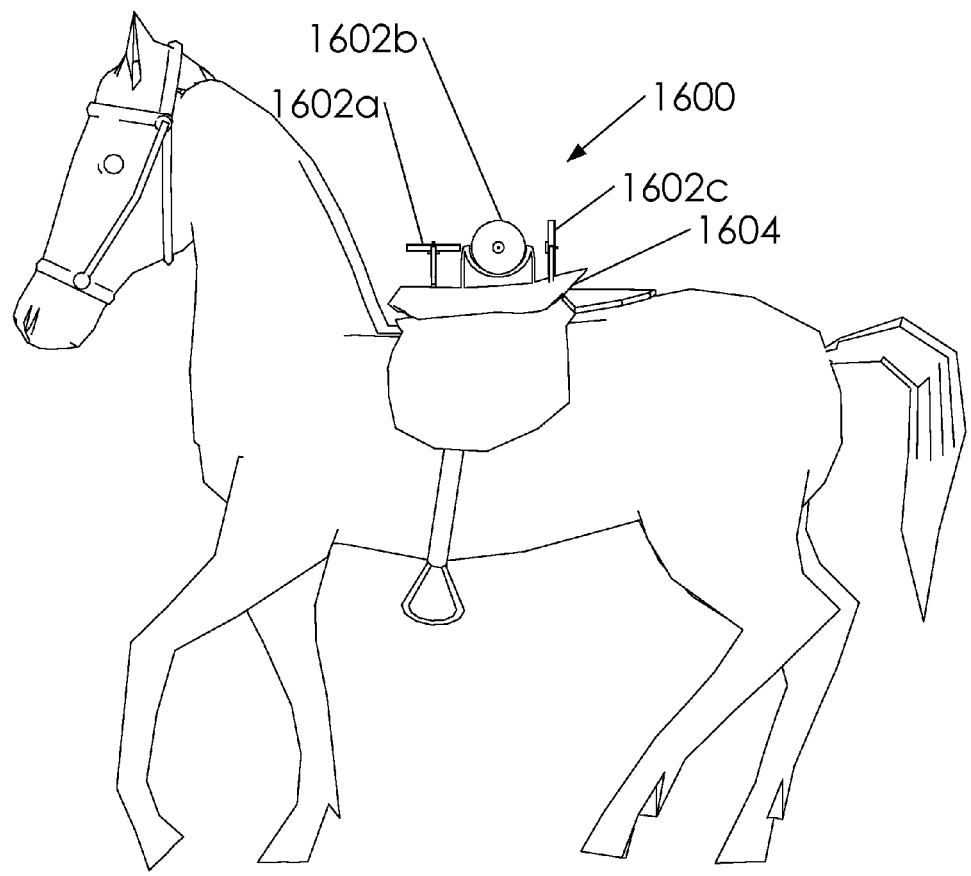
FIGS. 16A and 16B illustrate an elevated front view and top view of an animal training system.
Figure 16B:
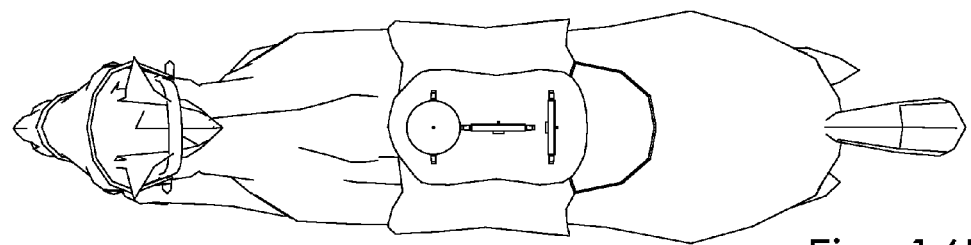

FIGS. 16A and 16B illustrate an elevated front view and top view of an animal training system 1600. In one embodiment, said animal training system 1600 can comprise one or more gyroscopic assemblies comprising a first gyroscopic assembly 1602*a*, a second gyroscopic assembly 1602*b*, and a third gyroscopic assembly 1602*c*. In one embodiment, said saddle 120 can be replaced with a flat saddle 1604. In one embodiment, said flat saddle 1604 can comprise a flatter top surface than said saddle 120, it can also lack said horn 122. In one embodiment, said one or more gyroscopic assemblies can attach to said flat saddle 1604 (illustrated) or said saddle 120 (not illustrated). In one embodiment, said animal training system 1600 can comprise said one or more gyroscopic assemblies oriented in three perpendicular planes. For example, in one embodiment, said first gyroscopic assembly 1602*a* can be substantially parallel with said flat saddle 1604; said second gyroscopic assembly 1602*b* and said third gyroscopic assembly 1602*c* can be perpendicular to said first gyroscopic assembly 1602*a*; and said second gyroscopic assembly 1602*b* can be substantially perpendicular to said third gyroscopic assembly 1602*c*. In one embodiment, attaching three of said one or more gyroscopic assemblies comprising a single axis to one location on said animal 102 can approximate use of a gyroscopic assembly comprising three axes.

Figure 17A:
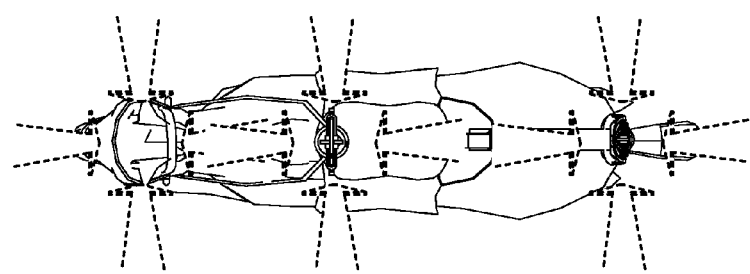
FIGS. 17A and 17B illustrate an elevated top view and side view of said animal training system on said animal.
Figure 17B:
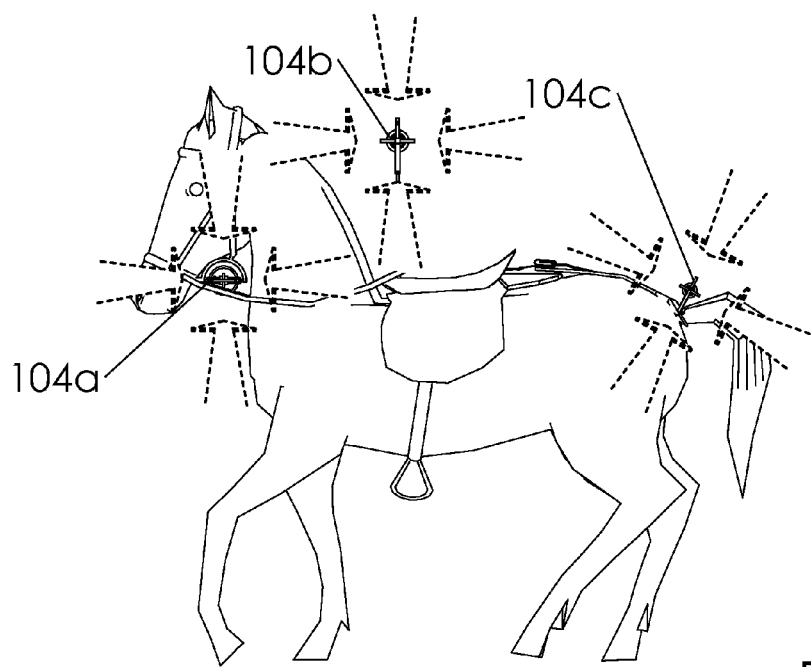

FIGS. 17A and 17B illustrate an elevated top view and side view of said animal training system 100 on said animal 102. In one embodiment, said animal training system 100 can generate one or more angular momentum forces and attach them to said animal 102. In one embodiment, said one or more angular momentum forces can be utilized in training said animal 102. In one embodiment, said one or more angular momentum forces can comprise those forces well known in mechanical physics. In one embodiment, said one or more angular momentum forces can comprise forces for maintaining and measuring orientation, based on the principles of angular momentum. In one embodiment, said one or more gyroscopic assemblies of said animal training system 100 can assert said one or more angular momentum forces in three axes (pitch, roll and yaw) which can resist reorientation in three dimensions (as illustrated with inwardly pointing directional arrows). In this sense, it can be said that said animal training system 100 can assert an omnipresent equilibrium orientation on said animal 102. In one embodiment, said one or more angular momentum forces at said second gyroscopic assembly 104*b* approximate a center of mass of a human, as if said human were sitting on said saddle 120. In one embodiment, said one or more angular momentum forces can be tuned so as to match a training program for said animal 102 and/or a skill of a rider on said animal 102. For example, in one embodiment, tuning said one or more angular momentum forces can comprise increasing or decreasing a speed of said one or more gyroscopic assemblies so as to increase and/or decrease said one or more angular momentum forces. In one embodiment, said one or more angular momentum forces can be used for safety of said rider after a training regime has completed. For example, in one embodiment, said one or more angular momentum forces can calm and steady said animal 102 for riding, working, or pulling tasks.

In one embodiment, said one or more angular momentum forces are capable of intercepting an equilibrium of said animal 102 (that is, a natural equilibrium of said animal 102) and cause said animal 102 to act in harmony with said one or more angular momentum forces. In one embodiment, said one or more angular momentum forces can break through a natural balance of said animal 102. In one embodiment, said one or more angular momentum forces are capable of causing said animal 102 to think more carefully about its balance. In one embodiment, said one or more angular momentum forces can be capable of putting said animal 102 out of balance and therefore causing said animal 102 to move in a desired path. In one embodiment, said animal 102 can be said to desire symmetry (that is, said equilibrium of said animal 102) on all forces acting on itself. For example, if said animal training system 100 put a forward pitch on said animal 102, said animal 102 may naturally attempt to move in according to said forward pitch and step forward. Thus, in one embodiment said animal training system 100 can be used for directing a movement of said animal 102.

In one embodiment, said animal training system 100 can be used for stabilization of said animal 102. For example, in one embodiment, said one or more gyroscopic assemblies can generate said one or more angular momentum forces powerful enough to influence said equilibrium said animal 102 so as to steady the motions of said animal 102. That is, said animal training system 100 can control a pitch, roll and yaw of said animal 102. In one embodiment, said animal training system 100 can prevent said animal 102 from rearing back, bucking, jerking, or other undesirable behaviors of said animal 102. A search of technologies concerning use of one or more of said one or more gyroscopic assemblies to control orientation (or "Control Moment Gyroscopes") will reveal that this concept is in use for control of spacecraft, aircraft and submergible vehicles, but not animals such as said animal 102.

In another embodiment, said animal training system 100 can be used to keep said animal 102 in a proper state of mind. For example, in one embodiment, where said animal 102 is a horse, said animal 102 can comprise a steady mindset (being safe for human interaction) and a disrupted mindset (being unsafe for human interaction). In one embodiment, said animal training system 100 can steady said animal 102 by applying said one or more angular momentum forces to said body 108 of said animal 102. For example, in one embodiment, said animal 102 can comprise a known set of gaits (that is, walking patterns); wherein, some gaits are known to indicate said steady mindset and others indicate said disrupted mindset. In one embodiment, said animal training system 100 can be selectively engaged to calm and/or steady said body 108 of said animal 102 so as to maintain or implement said steady mindset. In this way, said animal training system 100 can reinforce and/or correct behavior of said animal 102. Consequently, said animal training system 100 can facilitate self-control and training.

In one embodiment, said animal 102 can comprise said natural balance which occurs to said animal 102 by instinct. In one embodiment, a method of using said animal training system 100 can comprise breaking through a barrier of said natural balance of said animal 102 and (thereby) establishing an independent leadership role for said animal 102. Accordingly, said animal 102 can gain a self-confidence despite being influenced by said animal training system 100 or a human trainer. That is, said animal 102 can be made to be comfortable relinquishing control of said natural balance of said animal 102. Thus, in one embodiment said animal training system 100 can be used to establish a training protocol (or an order of authority) and understand the influences of training on himself.

Figure 18A:
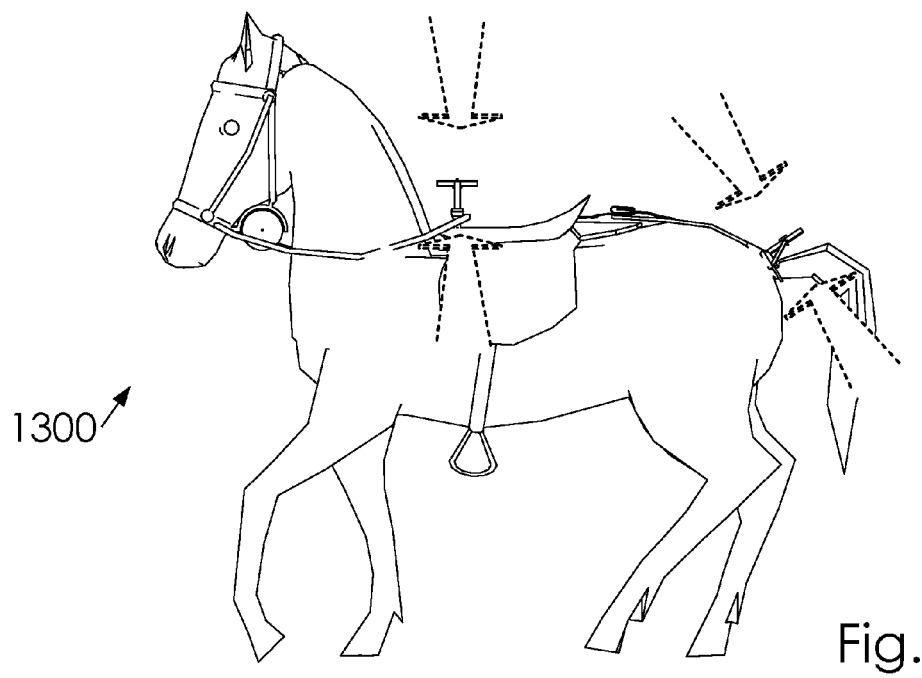
FIGS. 18A and 18B illustrate an elevated side view and top view of said animal training system on said animal.
Figure 18B:
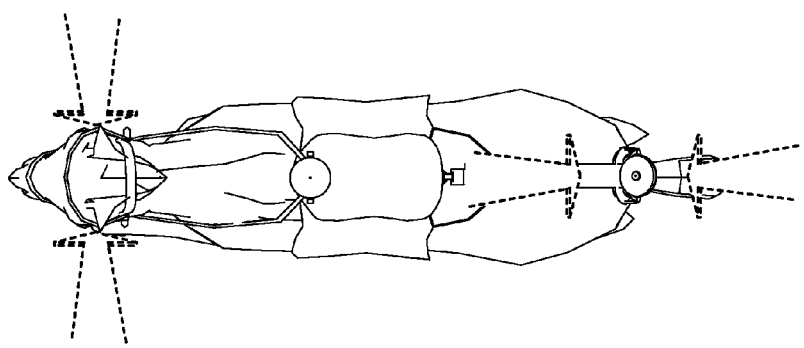

FIGS. 18A and 18B illustrate an elevated side view and top view of said animal training system 1300 on said animal 102. In one embodiment, said one or more gyroscopic assemblies of said animal training system 1300 can comprise said one or more angular momentum forces as applied to said animal 102. In one embodiment, said one or more gyroscopic assemblies of said animal training system 1300 can each comprise a single axis of rotation and therefore a single axis of said one or more angular momentum forces at each of said one or more gyroscopic assemblies. Accordingly, each of said one or more gyroscopic assemblies can be oriented so as to direct said one or more angular momentum forces as desired. In one embodiment, said one or more gyroscopic assemblies can run at different intensities so as to modify a portion of said one or more angular momentum forces asserted at different parts of said animal 102. In one embodiment, said second gyroscopic assembly 1304b can attach to said animal 102 with said gyroscope bracket 1401 or with said horn mount assembly 200; thus, said one or more angular momentum forces of said second gyroscopic assembly 1304b can mimic said center of mass of a human (like said second gyroscopic assembly 104b), as if said human were sitting on said saddle 120.

Figure 19A:
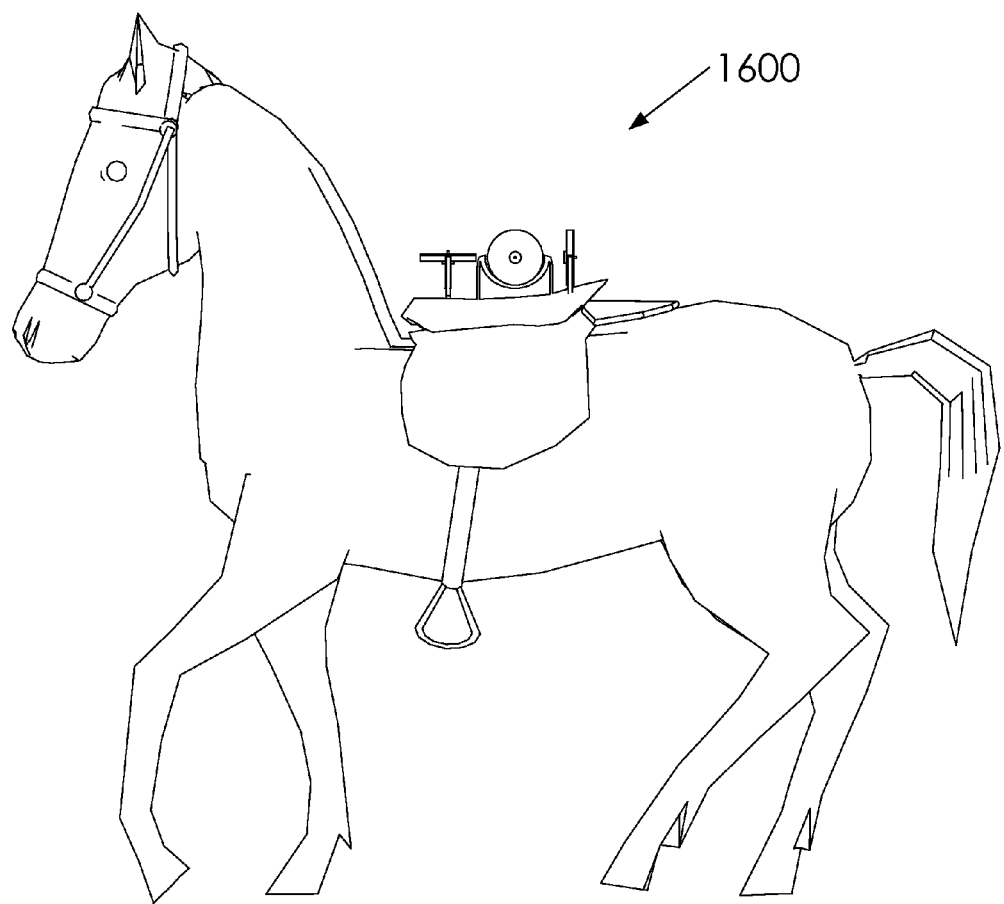
FIGS. 19A, 19B and 19C illustrate an elevated side overview, an elevated detail side view and top view of said animal training system.
Figure 19B:
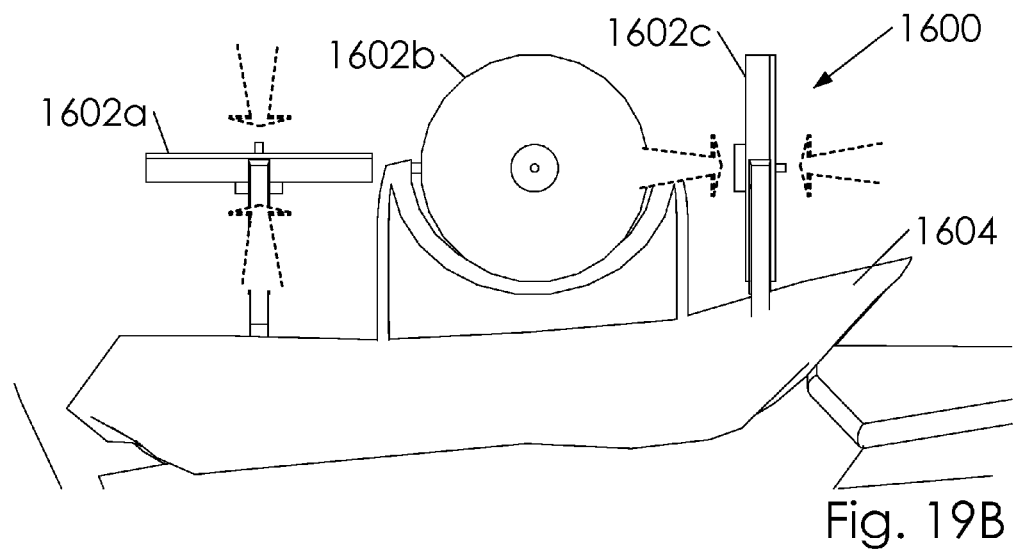
Figure 19C:
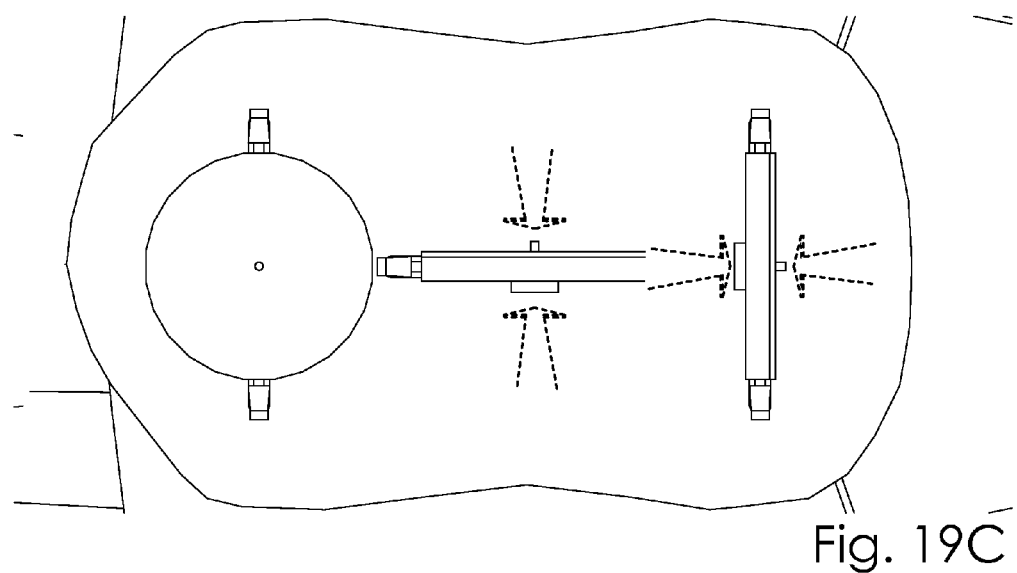

FIGS. 19A, 19B and 19C illustrate an elevated side overview, an elevated detail side view and top view of said animal training system 1600. In one embodiment, said animal training system 1600 can comprise said one or more angular momentum forces; wherein, said one or more angular momentum forces can be in three axes with one axis each provided by said first gyroscopic assembly 1602a, said second gyroscopic assembly 1602b, and said third gyroscopic assembly 1602c. Accordingly, in one embodiment, said one or more angular momentum forces can originate from one or more of said one or more gyroscopic assemblies attached to said animal 102 at a single location (such as said flat saddle 1604).

Figure 20:
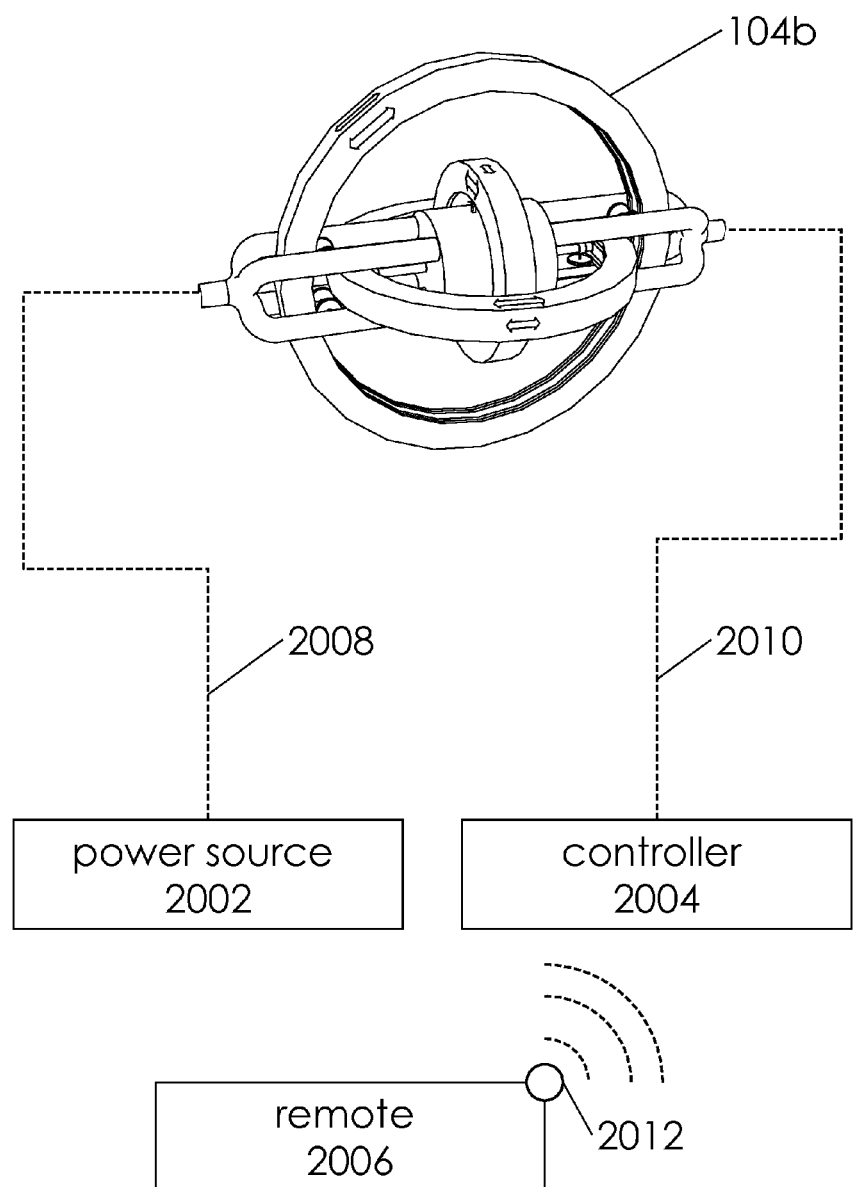
FIG. 20 illustrates a power and control schematic for one of said one or more gyroscopic assemblies.

FIG. 20 illustrates a power and control schematic for one of said one or more gyroscopic assemblies. In one embodiment, said one or more gyroscopic assemblies can be provided a power source 2002 from outside of each of said one or more gyroscopic assemblies. For example, in one embodiment, said power source 2002 can comprise said one or more solar panels 1320 and/or said battery bag 1230 (where said one or more gyroscopic assemblies run on electricity), a gas/petrol container (not illustrated) (where said one or more gyroscopic assemblies run on liquid and/or gaseous fuels), or possibly a steam reservoir (where said one or more gyroscopic assemblies run on steam). In one embodiment, said one or more gyroscopic assemblies can be controlled with a controller 2004. In one embodiment, said controller 2004 can adjust a speed of one or more gyroscopic disks or rings (such as said one or more external rotors or said gyro disk 1506). In one embodiment, said controller 2004 can disengage said power source 2002 from said one or more gyroscopic assemblies. In one embodiment, said controller 2004 can be controlled by a remote 2006. In one embodiment, said controller 2004 can control one or more of said one or more external rotors of said second gyroscopic assembly 104b independent of the others among said one or more external rotors. In one embodiment, said power source 2002 can be mounted within said second gyroscopic assembly 104b (for example at said central portion 1002, or external to said second gyroscopic assembly 104b (such as at said battery bag 1230). In one embodiment, said power source 2002 and/or said controller 2004 can be wired into said second gyroscopic assembly 104b (or any of said one or more gyroscopic assemblies) through one or more power lines 2008 for said power source 2002 and one or more control lines 2010 for said controller 2004. In one embodiment, said remote 2006 can communicate with said power source 2002 and/or said controller 2004 wirelessly with a wireless signal 2012 or through a wire connection (not illustrated). In one embodiment, said remote 2006 can control one or more of said one or more gyroscopic assemblies.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An animal training system comprising:
an animal harness assembly comprising at least a bridle;
one or more gyroscopic assemblies wherein each of said gyroscopic assemblies comprises one or more rotors and a pair of attachment prongs;
said one or more rotors each comprise an axis of rotation;
one or more gyroscope brackets comprising
a pair of sockets for attaching said gyroscope brackets to said one or more gyroscopic assemblies, and
a harness fastening member for attaching said gyroscope brackets to said animal harness assembly of an animal;
a power source attached to one or more engines;
said one or more engines transmit torque to said one or more external rotors;
wherein gyroscopic resistance forces are generated through rotation of said one or more external rotors of said one or more gyroscopic assemblies;
wherein said gyroscopic resistance forces are selectively applied to alter an equilibrium of said animal;
wherein said one or more gyroscope brackets comprise a first gyroscope bracket;
wherein said one or more gyroscopic assemblies comprise a first gyroscopic assembly;
wherein said first gyroscope bracket is connected to said bridle by said harness fastening member;
wherein said first gyroscope bracket attaches said first gyroscopic assembly to said bridle such that gyroscopic resistance forces produced by said first gyroscopic assembly are transferred directly to the head of the animal wearing the harness through said bridle.

2. The animal training system of claim 1,
wherein gyroscopic resistance forces provide an omnipresent equilibrium orientation as applied to said animal.

3. The animal training system of claim 1, wherein
said one or more gyroscope brackets further comprise a third gyroscope bracket;
said one or more gyroscopic assemblies further comprise a third gyroscopic assembly;
said animal harness assembly further comprises a tail strap assembly adapted to selectively attach to a tail of said animal;
said third gyroscope bracket attaches to said tail strap assembly;
said third gyroscope bracket attaches said third gyroscopic assembly to said animal; and
said one or more gyroscopic resistance forces are directed toward a rearward portion of said animal.

4. The animal training system of claim 3 wherein, said one or more gyroscopic resistance forces are directed toward a tail head of said animal.

5. The animal training system of claim 1 further comprising said one or more gyroscope brackets comprise a second gyroscope bracket;
said one or more gyroscopic assemblies comprise a second gyroscopic assembly;
said second gyroscope bracket attaches to said animal at a saddle;
said second gyroscope bracket attaches said second gyroscopic assembly to said animal; and
said one or more gyroscopic resistance forces are directed toward a midsection of said animal.

6. The animal training system of claim 5 wherein,
said second gyroscope bracket attaches to a horn of said saddle.

7. The animal training system of claim 6 wherein,
said second gyroscope bracket comprises a base portion having an external threading selectively attaching said second gyroscope bracket to said horn; and
said horn comprises a socket having an internal threading selectively receiving a portion of said base portion of said second gyroscope bracket.

8. The animal training system of claim 1 wherein:
said power source comprises one or more batteries;
said one or more engines comprise one or more electric motors; and
said one or more electric motors propel said one or more external rotors.

9. The animal training system of claim 1 wherein
said power source comprises a gas tank;
said one or more engines comprise one or more internal combustion engines; and
said one or more internal combustion engines propel said one or more rotors.

10. The animal training system of claim 1 wherein:
said one or more rotors comprises said one or more external rotors rotating around one or more internal rails on one or more bearings.

11. The animal training system of claim 10 wherein said one or more bearings comprise magnetic bearings.

12. The animal training system of claim 10 wherein said one or more bearings comprise ball bearings.

13. The animal training system of claim 10 wherein said one or more external rotors are arranged in a tri-axial configuration.

14. The animal training system of claim 13 further comprising
said one or more external rotors comprise a first external rotor having a center axis, a second external rotor having a center axis, and a third external rotor having a center axis;
said one or more internal rails comprises a first internal rail, a second internal rail, and a third internal rail;
said first external rotor arranged around said first internal rail;
said second external rotor arranged around said second internal rail;
said third external rotor arranged around said third internal rail;
said center axis of said first external rotor can be perpendicular to said center axis of said third external rotor;
said center axis of said third external rotor can be perpendicular to said center axis of said second external rotor; and
said center axis of said first external rotor can be perpendicular to said center axis of said second external rotor.

15. The animal training system of claim 1 further comprising said one or more engines are powered in part by one or more solar panels attached to said animal.

16. The animal training system of claim 1 further comprising a casing assembly attached around a portion of said one or more gyroscopic assemblies.

17. The animal training system of claim 1 wherein:
said one or more gyroscopic resistance forces are selectively applied to steady a body of said animal so as to maintain or implement a desired gait.

18. The animal training system of claim 1 further comprising
said bridle of said animal harness assembly configured to attach to a horse; and
wherein said animal harness assembly selectively applies said gyroscopic resistance forces to a horse wearing said animal harness assembly.

19. An animal training method comprising:
attaching an animal harness assembly comprising one or more gyroscopic assemblies and a bridle,
selectively attaching said animal harness assembly to an animal,
wherein each of said one or more gyroscopic assemblies comprising one or more rotors and a pair of attachment prongs;
wherein said one or more rotors each comprise an axis of rotation;
generating one or more gyroscopic resistance forces with said one or more gyroscopic assemblies by rotating said one or more rotors with one or more engines, and
training said animal by selectively applying said one or more gyroscopic resistance forces so as to maintain or implement a desired gait of said animal;
wherein said one or more gyroscope brackets comprising
a pair of sockets for attaching said gyroscope brackets to said one or more gyroscopic assemblies, and
a harness fastening member for attaching said gyroscope brackets to said animal harness assembly of an animal;
wherein said animal harness assembly further comprising a power source attached to said one or more engines;
wherein said one or more engines transmit torque to said one or more rotors;
wherein gyroscopic resistance forces are generated through rotation of said one or more rotors of said one or more gyroscopic assemblies;
wherein said one or more gyroscope brackets comprise a first gyroscope bracket;
wherein said one or more gyroscopic assemblies comprise a first gyroscopic assembly;
wherein said first gyroscope bracket is connected to said bridle by said harness fastening member;

wherein said first gyroscope bracket attaches said first gyroscopic assembly to said bridle such that gyroscopic resistance forces produced by said first gyroscopic assembly are transferred directly to the head of the animal wearing the harness through said bridle.

20. The animal training method of claim 19 wherein, training said animal comprises:
stabilizing said animal with said one or more gyroscopic resistance forces generated by said one or more gyroscopic assemblies.

21. The animal training method of claim 20 further comprising applying an omnipresent equilibrium orientation to said animal; wherein,
said one or more gyroscopic assemblies comprise tri-axial gyroscopes.

22. The animal training method of claim 19 wherein, training said animal comprises:
applying said one or more gyroscopic resistance forces and putting said animal out of balance.

23. The animal training method of claim 19 wherein, training said animal comprises:
applying said one or more gyroscopic resistance forces and putting said animal out of balance; and
establishing a leadership role for said animal with said one or more gyroscopic assemblies.

24. The animal training method of claim 19 wherein, training said animal comprises:
directing a movement of said animal by:
applying said one or more gyroscopic resistance forces and
putting said animal out of balance in a direction of a desired path.

25. The animal training method of claim 19 further comprising:
applying said one or more gyroscopic resistance forces to one or more portions of a body of said animal.

26. The animal training method of claim 25 further comprising:
simulating a center of mass of a human by placing one or more of said one or more gyroscopic assemblies above a midsection of said body of said animal.

27. An animal training system comprising:
an animal harness assembly comprising at least a saddle;
one or more gyroscopic assemblies wherein each of said gyroscopic assemblies comprises one or more rotors and a pair of attachment prongs;
said one or more rotors each comprise an axis of rotation;
one or more gyroscope brackets comprising
a pair of sockets for attaching said gyroscope brackets to said one or more gyroscopic assemblies, and
a harness fastening member for attaching said gyroscope brackets to said animal harness assembly of an animal;
a power source attached to one or more engines;
said one or more engines transmit torque to said one or more rotors;
wherein gyroscopic resistance forces are generated through rotation of said one or more rotors of said one or more gyroscopic assemblies;
wherein said gyroscopic resistance forces are selectively applied to alter an equilibrium of said animal;
wherein said one or more gyroscope brackets comprises a first gyroscope bracket;
wherein said one or more gyroscopic assemblies comprises a first gyroscopic assembly;
wherein said first gyroscope bracket is connected to said saddle by said harness fastening member;
wherein said first gyroscope bracket attaches said first gyroscopic assembly to a horn of said saddle such that gyroscopic resistance forces produced by said first gyroscopic assembly are transferred directly to the midsection of the animal wearing the harness through said saddle.

28. The animal training system of claim 27 wherein,
said first gyroscope bracket comprises a base portion having an external threading selectively attaching said first gyroscope bracket to said horn; and
said horn comprises a socket having an internal threading selectively receiving a portion of said base portion of said first gyroscope bracket.

* * * * *